(12) United States Patent
Evans et al.

(10) Patent No.: US 6,832,573 B2
(45) Date of Patent: Dec. 21, 2004

(54) WHEEL-MOUNTED TIRE PRESSURE GAUGE

(75) Inventors: Harold A. Evans, 10 Merrymount Dr., Swampscott, MA (US) 01907; William A. Loginov, Londonderry, NH (US)

(73) Assignee: Harold A. Evans, Swampscott, MA (US)

( * ) Notice: Subject to any disclaimer, the term of this patent is extended or adjusted under 35 U.S.C. 154(b) by 0 days.

(21) Appl. No.: 10/632,021

(22) Filed: Jul. 31, 2003

(65) Prior Publication Data

US 2004/0020420 A1 Feb. 5, 2004

Related U.S. Application Data

(63) Continuation-in-part of application No. 10/172,881, filed on Jun. 17, 2002, now abandoned, which is a continuation-in-part of application No. 09/823,493, filed on Mar. 30, 2001, now abandoned.

(51) Int. Cl.[7] ............................................. B60C 23/04
(52) U.S. Cl. .................................... 116/34 R; 73/146.8
(58) Field of Search .................... 116/34 R; 73/146.8; 137/229; 248/200, 205.1; 340/442, 445, 447

(56) References Cited

U.S. PATENT DOCUMENTS

| | | | |
|---|---|---|---|
| 1,350,068 A | | 8/1920 | Cody |
| 1,482,237 A | | 1/1924 | Lent |
| 1,601,315 A | | 9/1926 | Manning |
| 3,230,968 A | * | 1/1966 | Struby ..................... 137/227 |
| 3,380,427 A | | 4/1968 | Rubin |
| 3,592,218 A | * | 7/1971 | Guy et al. ................ 137/227 |
| 3,680,523 A | | 8/1972 | Gaskins |
| 3,889,530 A | | 6/1975 | Bluem |
| 3,999,503 A | * | 12/1976 | Brannis et al. ........... 116/34 R |
| RE29,116 E | | 1/1977 | Guy et al. |
| 4,072,048 A | | 2/1978 | Arvan |
| 4,388,771 A | | 6/1983 | Lalonde |
| 4,476,803 A | * | 10/1984 | Malec ...................... 116/34 R |
| 4,581,925 A | | 4/1986 | Crutcher |
| 4,694,273 A | | 9/1987 | Franchino |
| 4,723,445 A | * | 2/1988 | Ripley et al. ............... 73/146.3 |
| 4,763,517 A | | 8/1988 | Feinberg |
| 4,924,697 A | | 5/1990 | Hunt et al. |
| 4,953,395 A | * | 9/1990 | Jard ......................... 73/146.8 |
| 5,100,206 A | | 3/1992 | Feng |
| 5,103,670 A | * | 4/1992 | Wu et al. .................. 73/146.8 |
| 5,503,012 A | | 4/1996 | Rabizadeh |
| 5,665,908 A | | 9/1997 | Burkey et al. |
| 5,770,797 A | | 6/1998 | Lapohn |
| 5,819,779 A | | 10/1998 | Takemura et al. |
| 5,929,330 A | * | 7/1999 | Ford ......................... 73/146.8 |
| 6,011,463 A | | 1/2000 | Cormier, Sr. |
| 6,055,925 A | * | 5/2000 | Horton ..................... 116/34 R |
| 6,167,900 B1 | | 1/2001 | Laird |
| 6,293,297 B1 | | 9/2001 | Maldonado et al. |

* cited by examiner

Primary Examiner—Diego Gutierrez
Assistant Examiner—R. Alexander Smith
(74) Attorney, Agent, or Firm—Cesari and McKenna, LLP; William A. Loginov

(57) ABSTRACT

A tire pressure gauge is provided. The tire pressure gauge is mounted on a rim of a wheel or on a hub of the wheel. An interconnection is made to the valve stem of the wheel. The interconnection includes a tap that directs pressure from the interconnection via a tube or conduit to the gauge. The interconnection can provide continuous pressure to the gauge or can be actuated by the movement of an operator at a predetermined inspection time. The gauge can be mechanical or electronic.

17 Claims, 19 Drawing Sheets

WHEEL-MOUNTED TIRE PRESSURE GAUGE

CROSS-REFERENCE TO RELATED APPLICATIONS

The present application is a continuation-in-part of commonly assigned U.S. patent application Ser. No. 10/172,881, which was filed on Jun. 17, 2002, now abandoned, as a continuation-in-part of commonly assigned U.S. patent application Ser. No. 09/823,493, which was filed on Mar. 30, 2001, now abandoned, by Evans et al. for a Wheel-mounted Tire Pressure Gauge. Both above-noted patent applications are hereby incorporated by reference as though fully set forth herein.

FIELD OF THE INVENTION

This invention relates to tire pressure gauges and more particularly to gauges that are permanently or semi-permanently mounted on a vehicle wheel.

BACKGROUND OF THE INVENTION

Recent well-publicized events involving catastrophic failure of vehicle tires, often resulting in death and grievous bodily harm, have reemphasized the importance of maintaining proper inflation pressure on all tires at all times. Where proper tire inflation pressure is not maintained, tires will wear prematurely, exhibit degraded handling characteristics and, where they're already worn or defective, potentially suffer complete failure.

While the majority of vehicle operators and motorists are aware of the importance of a maintaining proper inflation pressure, the near-elimination of full-service stations, and reduction in number of user-serviceable components on automobiles, has reduced the likelihood that full attention will be paid to tires and rims. In addition, a proper check of tire pressure typically involves the application of a discrete tire pressure gauge to the valve stem of each wheel, after unscrewing the step cap. Many vehicle operators do not even carry such a gauge, or if they do, it is often misplaced or inaccessible when needed (e.g. buried in the trunk or between seat cushions). Furthermore, it is less likely that the average motorist will take the time to perform this necessary or complex task in today's overscheduled world. Consequently, a check of tire pressure will occur, if at all, only when a tire appears visually low on pressure. At this point, the tire is, in fact, dangerously low.

Some military and commercial vehicles assist operators in determining pressure by providing fixed gauges with respect to each wheel. These gauges are mounted firmly on the wheel or axle, and generally are part of the vehicles original equipment. In any case, these specialized wheels are purpose-built to receive the gauge. In fact, some military vehicles completely alleviate the problem of low tire pressure by providing integral tire inflation systems, typically using the axles as pressure conduits. These systems are prohibitively expensive and complex for all but the most high-end sport utility vehicles—the civilian Hummer® manufactured by American General for example.

While there have been proposals in the prior art to provide basic tire pressure gauges to portions of wheels on more-common passenger cars, these have generally involved rather unaestethic or complex mounting arrangements that may include the drilling and tapping of air feed/mounting holes into the pressurized rim.

Accordingly, it is an object of this invention to provide an easily readable and mountable pressure gauge for application to a wheel of a vehicle. The gauge should be unobtrusive or otherwise aestethically intergrated into the design of the wheel. The gauge should not require any significant alteration to the underlying wheel structure or tire and should be easily mounted by either a home user or moderately equipped tire shop. It should be mountable on a variety of wheel types including those with one-piece alloy construction and those using separate hubcaps or beauty rings. The gauge should also be capable or integrating modern electronics for further versatility.

SUMMARY OF THE INVENTION

This invention overcomes the disadvantages of the prior art by providing a tire pressure gauge for mounting on a vehicle wheel, and associated interconnections, that enable the gauge to placed in direct pressure/fluid communication with a preexisting pressure inlet/outlet of the wheel such as a valve stem.

According to one embodiment, the tire pressure gauge is mounted on either an edge of the rim, in a location that is discreet-but-visible, or on a center/hub area of the wheel. The mounting can be either with respect to a solid alloy-style rim or a hubcap that is removable. A variety of mounting techniques can be employed including water-resistant adhesive (such as silicone), double-sided exterior grade tape, rivets or screws. The gauge can be mounted directly to the underlying rim portion or, it can be carried on a mounting plate that is flush against the rim, or raised up. Particularly where the gauge/display is electronic, it can be integrated into the appearance of the wheel. One specific location for a light-up electronic display is in a darkened area on the center hub area. Such an electronic gauge can be actuated by pressing or otherwise switching on the wheel hub area.

Pressure can be channeled to the gauge, regardless of location, through an appropriately sized tube capable of withstanding normal tire pressures without breaking, splitting or disconnecting. The tube can be interconnected with a separate saddle valve that is applied over, and forms a seal with respect to, the tire's existing valve stem. A secondary fill outlet with cap and press valve can be provided on the saddle valve. The saddle valve can include a centered nub for pressing down the preexisting press valve on the valve stem when it is attached and fully secured. In this manner, pressure is communicated from the original stem to the saddle valve, and whence to the pressure gauge feed tube. Alternatively, the valve stem of the wheel can be replaced with a modified valve stem having a tap that directs pressure to the gauge feed tube, the tap being positioned below the level of the press valve so that constant fluid communication is maintained.

According to the invention, the saddle valve, or another portion of the valve stem can be spring-loaded so that it directs pressure into the gauge only when the spring-loaded feature is actuated by an applied force. In this manner, the press valve seal of the original valve stem can be maintained, and the possibility of leakage through the saddle valve or tap is minimized. A locking mechanism may be employed to continuously actuate the spring-loaded feature, even in the absence of an externally applied force. That is, an external force may initially actuate the spring to establish constant fluid communication between the valve stem and the pressure gauge. Thereafter, the locking mechanism can maintain the constant pressure flow to the gauge once the external force is removed. The saddle valve can be provided with a separate, typically top-mounted, filler tap and press valve.

In an exemplary embodiment, the spring-loaded saddle valve is depressed by an applied force, thereby driving its centered nub downward onto the preexisting press valve in the tire's valve stem. The centered nub, in turn, bears downwardly against the preexisting press valve, enabling air to flow from the tire into the saddle valve to a pressure gauge coupled to the saddle valve. The saddle valve may be secured in this position by engaging a locking mechanism on the saddle valve, thereby providing constant air flow from the tire to the gauge, even in the absence of the applied force. When the saddle valve is no longer depressed by the applied force or the locking mechanism, the restoring force of the compressed spring lifts the centered nub from the tire's press valve, consequently shutting off air flow from the tire.

An air hose may be applied to the filler tap of the saddle valve to direct air flow from the hose to the tire. In the exemplary embodiment, a downward pressure may be applied to the spring-loaded saddle valve to enable air communication between the tire and the saddle valve, and application of the hose may depress the filler tap's press valve enabling air communication between the saddle valve and the hose. A locking mechanism on the saddle valve may be engaged to maintain air flow from the saddle valve to the tire even when the downward pressure is removed. This locking mechanism can be actuated by rotating an upper member of the saddle valve with respect to a base member that is attached to the tire stem. In an alternate embodiment, when the air hose is applied to the filler tap, it depresses the saddle valve's press valve while the pressure moves the saddle valve downwardly to depress the original valve stem press valve, thus completing a connection that enables air to flow into the wheel.

Finally, according to another alternate embodiment, each saddle valve can comprise a compact pressure transducer, of the type used generally in commercially available electronic tire pressure gauges. The transducer can drive a digital display located on the saddle valve. Alternatively, the transducer can transmit telemetry to a compact electronic radio transmitter that transmits an encoded radio signal at a desired interval to a main receiver in the vehicle passenger compartment so as to continuously update the receiver with tire pressure information for each of the vehicle wheels being monitored.

BRIEF DESCRIPTION OF THE DRAWINGS

The foregoing and other objects and advantages of the invention will become clearer with reference to the following detailed description as illustrated by the drawings in which.

DETAILED DESCRIPTION OF ILLUSTRATIVE EMBODIMENTS

Figure 1:
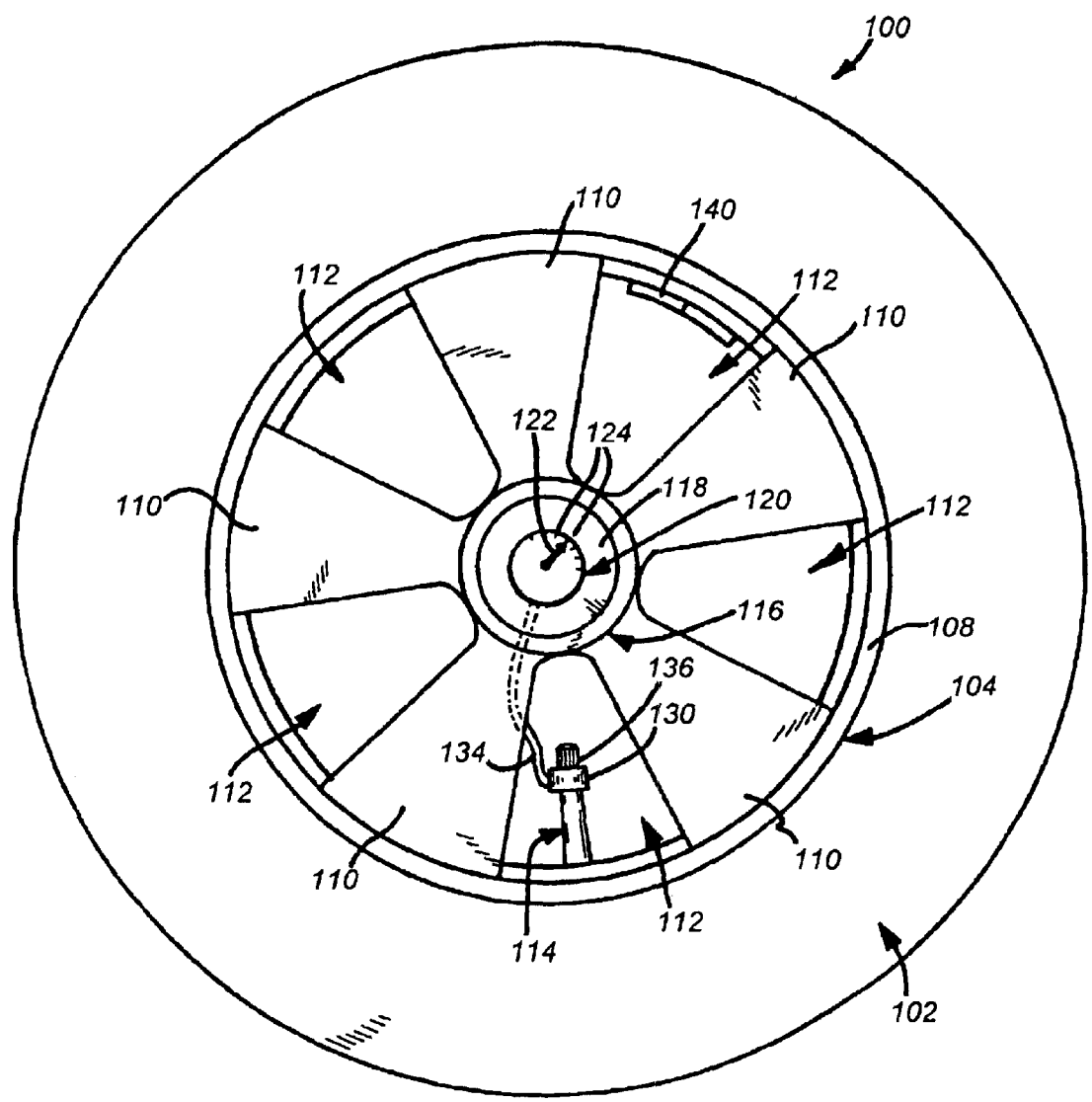
FIG. 1 is a side view of an exemplary wheel, including a tire and rim having a hub-mounted tire pressure gauge and valve stem interconnection according to an embodiment of this invention.

FIG. 1 shows a conventional wheel assembly 100 consisting of a tire 102 an inner rim 104. The rim 104 can comprise a solid steel rim having an outer hubcap (optional) or an alloy-style rim consisting of a unitary outer rim 108 upon which the tire is mounted. A spoke assembly comprising a series of five spokes 110 with internal spaces 112 between the spokes 110 is also shown. The spokes 110 intersect at a hub 116 that can include a series of circumfrential wheel lugs (not shown). The lugs can be covered by a hub cover piece 118. Within the cover piece 118 is provided a tire pressure gauge 120 according to an embodiment of this invention. The tire pressure gauge includes a pressure indicator needle 122 and appropriate graduations 124 that extend through the normal operating range of a tire (typically 20–40 PSI for automobiles). The gauge can be adapted for surface mounting on the hub, or can be neatly recessed and flush with the surface of the hub.

Figure 2:
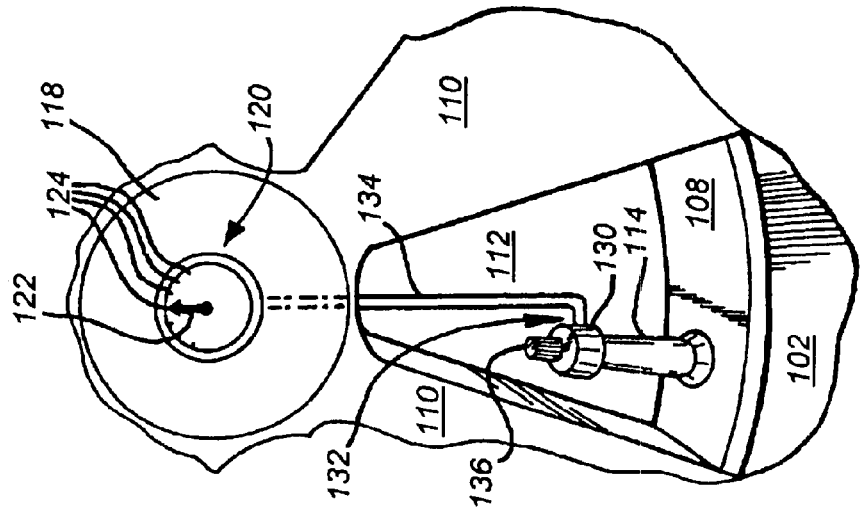
FIG. 2 is a fragmentary perspective view of the tire and rim with pressure gauge and valve stem interconnection of FIG. 1.

With further reference to FIG. 2, the valve stem 114 includes a saddle valve 130, the details of which are described further below. Briefly, the saddle valve of this embodiment is secured to the original threads of the valve stem 114 in a manner that causes pressurized air from the wheel to flow into the saddle valve 130 via the valve stem. A tap 132 is interconnected with a small-diameter, high-pressure airline 134 having an outlet interconnected with the gauge 120. The saddle valve includes a saddle valve cap 136 that removably encloses a secondary fill inlet for filling the tire when desired through the saddle valve (without removing the saddle valve). Note that any added weight produced by the pressure gauge and saddle valve arrangement according to the various embodiments of this invention can be compensated-for using self-adhesive or clip on tire balancing weights 140 (FIG. 1). In addition the geometry of the valve and materials used can be adapted to reduce angular momentum effects on the saddle valve and underlying valve stem during wheel rotation. For example, a shortened valve stem that places the saddle valve closer to the rim cam be used. Likewise, the saddle valve can be constructed to largely override the sides of the valve stem with reduced axial extension to both reinforce the valve stem, and place saddle valve mass closer to the rim (thus avoiding excessive bending moments on the valve stem). In addition, lightweight materials (plastics, composites, aluminum/titanium) can be used to construct saddle valve components.

Figure 3:
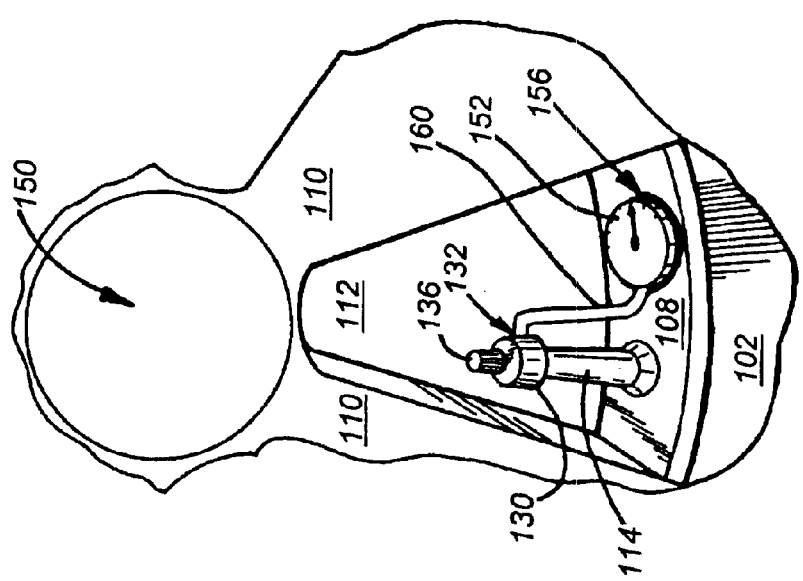
FIG. 3 is a fragmentary perspective view of the tire and rim of FIG. 3 showing a rim-mounted pressure gauge that is adhesively attached according to an alternate embodiment.

FIG. 3 illustrates an alternate embodiment in which the hub cover 150 of the wheel contains no visible gauge. Rather, a gauge 152 is located along the inside edge of the rim 108 using an adhesive material 156. The adhesive material can comprise any number of water resistant and weatherproof adhesive materials. Such materials include, but are not limited to, double-sided tape, silicon-based glues, polyurethane cements, and the like. In particular an acceptable type of tape is commercially available for use in adhering balancing weights to wheels at present. The exact mounting position for the gauge can vary. Typically, it may be desirable to mount it close to the valve stem. However, it can be mounted in an adjacent open space 112 (on the other side of an adjacent spoke), if space is limited within the bay containing the valve stem. It may also be mounted on the base of the rim, as shown, or upon any flat or semi-flat surface within the rim that is appropriately visible. Where aesthetics are a concern, the gauge can be mounted behind one of the spokes (where space permits) in a manner that enables it to be viewed indirectly.

The mechanical gauges used herein can be any kind of appropriately sized circular, square or otherwise-shaped gauge. Typically, it is desirable to use a small, commercially available gauge having a diameter of between ½ and 1-inch. A sufficiently heavy duty gauge should be employed so that it is capable of withstanding the centripetal forces generated by the rim as well as repeated shocks delivered by the wheel as it traverses rough ground. As will be described further below, in mounting, the feed tube 160 for this gauge (and for other gauges described herein) can be attached to press-fit, pressure-connection nipples on the gauge and/or the saddle valve 130 after the tube has been cut to an appropriate length. A variety of commercially available clear or colored pressure tubes, for engaging serrated pressure nipples, can be employed. Alternatively, a fixed metallic tube constructed from copper, brass or a durable alloy can be provided between the saddle valve and the gauge. A removable tube or resilient (plastic) may be preferable where space is limited and the saddle valve must be applied by screwing it on to the threads of the valve stem (since a fixed tube may bind or become tangled).

Figure 4:
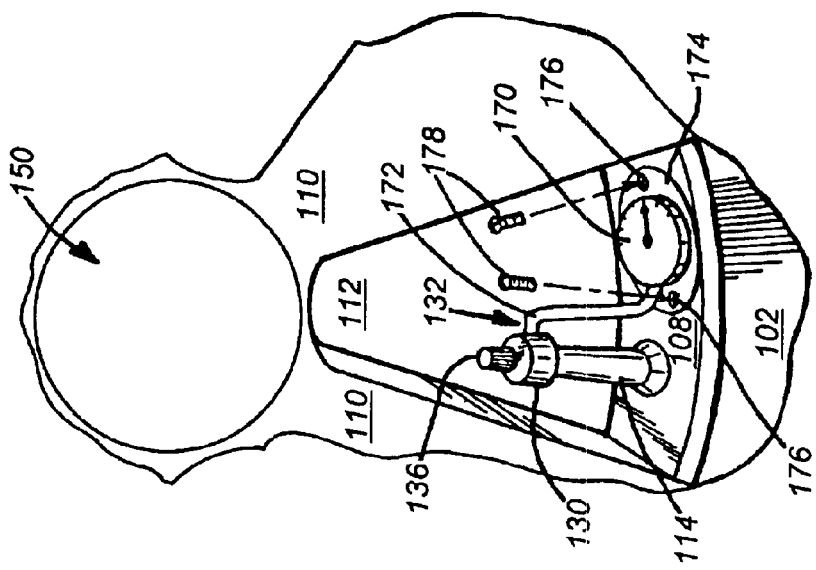
FIG. 4 is a fragmentary perspective view of the tire and rim of FIG. 1 showing a rim-mounted pressure gauge that is mechanically attached to the rim according to an alternate embodiment.

FIG. 4 shows an alternate embodiment of a gauge 170 interconnected to the saddle valve 130 by a feed tube 172. The gauge 170 is mounted on a backing plate 174 having a pair of mounting holes 176. The mounting holes receive the fasteners 178. These fasteners can be self-threading screws, pop rivets or any other acceptable fastener. In this embodiment, the holes 176 are placed over a suitable location on the rim, and shallow (non-penetrating) holes are drilled into the rim. The fasteners are secured into the holes by an appropriate technique. While shallow holes can be used to mount this gauge to a pressure wall of the rim, in this embodiment it is preferable to mount the gauge at a location that does not penetrate the pressure wall of the rim, so as to avoid leaks. The backing plate 174 can also be secured using adhesive or tape alone, or in combination with fasteners. The exact shape of the mounting plate can be varied.

Figure 5:
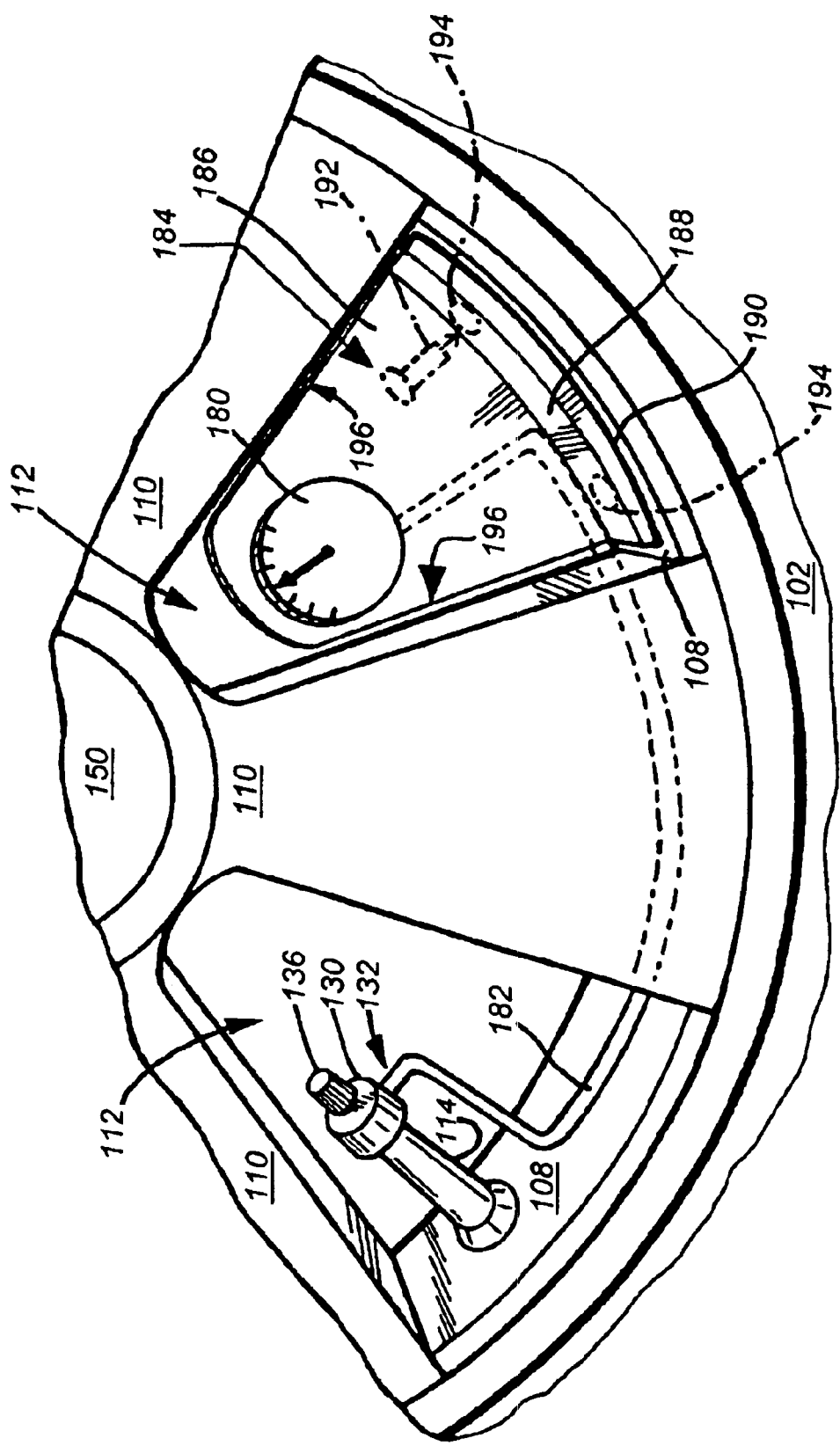
FIG. 5 is a fragmentary perspective view of the tire and rim of FIG. 1 showing a mechanically attached rim-mounted pressure gauge with a raised mounting according to an alternate embodiment.

FIG. 5 shows another embodiment in which the saddle valve 130 is interconnected to the gauge 180 by an elongated feed tube 182 that passes behind (hidden tube portion shown in phantom) the adjacent spoke 110. In this embodiment, the gauge 180 is separated by at least one open space 112 from the valve stem. The gauge 180 is mounted on a mounting bracket 184 defining an L-shape. The main upright 186 of the bracket 184 supports the gauge 180 in a suspended location that faces the user directly. The gauge can be mounted to the upright 186 using screws, adhesive, or any acceptable mounting assembly. To mount the gauge to the upright, typically, bolts, nuts, screws or other mounts are passed through the plate-like upright 186 and secured on the back (not shown) the tube 182 passes around the back of the upright 186 (shown in phantom) to join a tap on the gauge at the rear. The base 188 of the bracket 184 is secured to the rim 108 using adhesive, double-sided tape or another securing mechanism 190. Alternatively, screws, rivets or other mechanical fasteners 192 (shown in phantom as optional) pass through holes 194 to mechanically secure the bracket to the rim. The outline perimeter 196 of the bracket 184 is sized generally to conform to the shape of the open space 112 between spokes 110 in this embodiment. In practice, any shape can be employed. The color of the bracket can be adapted to match rim color (silver for example) or offset rim color (black for example).

Figure 6:
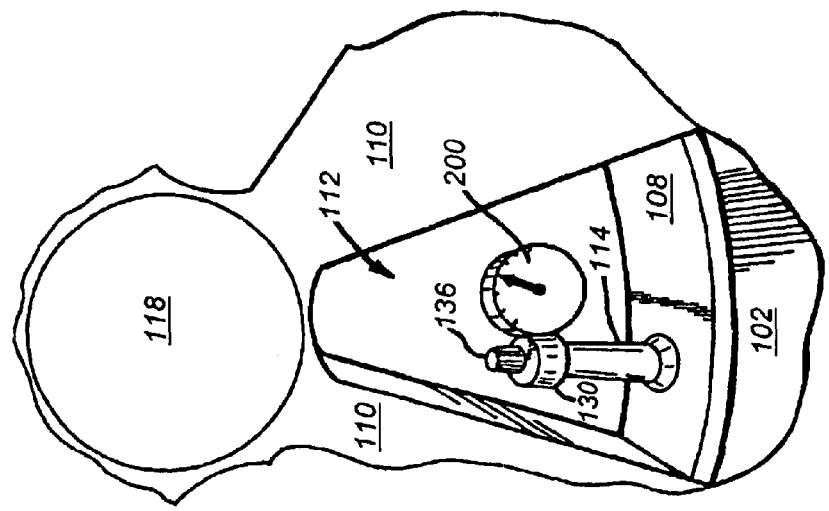
FIG. 6 is a fragmentary perspective view of the tire and rim of FIG. 1 showing a valve stem-mounted pressure gauge according to an alternate embodiment.

FIG. 6 shows an alternate embodiment of a wheel in which the valve stem 114 carries a saddle valve 130 having a gauge 200 directly attached thereto along one side. The exact positioning of the gauge can be varied. For example, in any of the embodiments described herein, the secondary filler inlet and cap 136 can be located on the side of the saddle valve, while the pressure tap and/or gauge can be located on top of the saddle valve. The gauge 200 is attached (in fluid/pressure communication) to the side of the saddle valve using, for example, a press-fit, solder or matting threads. As described above, a reinforced or shortened stem may be desirable in this embodiment to reduce any angular momentum-induced bending effect brought about by high-speed rotation of the wheel in combination with the mass of the valve or gauge assembly.

Figure 7:
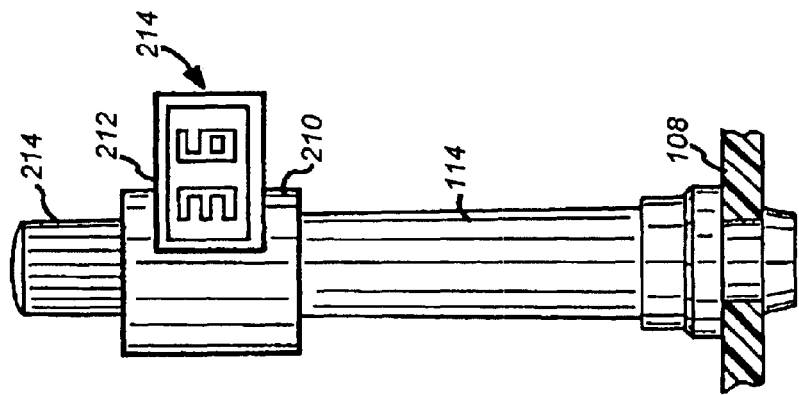
FIG. 7 is a side view of a valve stem-mounted electronic pressure gauge according to an alternate embodiment.

FIG. 7 illustrates a valve stem 114 having a saddle valve 210 with an integral electronic pressure gauge 212 according to an alternate embodiment. The stem also includes a fill inlet and cap 214 as described above. The gauge 212 can incorporate any commercially available pressure transducer and electronic display assembly including light emitting diode (LED) digits and liquid crystal display (LCD) digits. The container 214 which holds a display on the saddle valve can include the transducer that is integrated with the saddle valve body 210, a small battery and any other required electronics. The size of the container 214 can be varied so that it houses the components effectively. The saddle valve can itself be constructed sufficiently large to house the display and associated electronics according to an illustrative embodiment. An enlarged saddle valve for storing electronics is shown, for example, in FIG. 16 described below.

Figure 8:
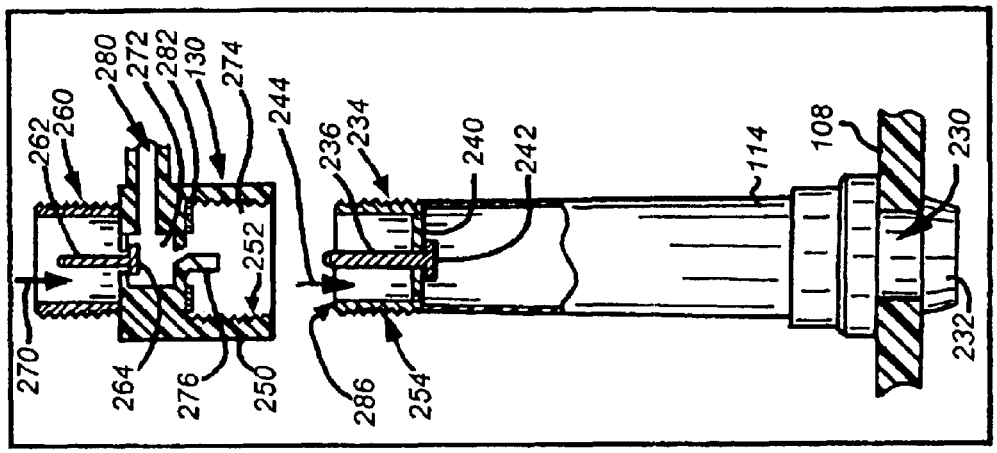
FIG. 8 is a partial side cross section of a valve stem and saddle valve pressure gauge interconnection according to an embodiment of this invention.

Having described various placements and configurations for gauges, the construction of associated pressure connections for directing air pressure to the gauges is now described in further detail. FIG. 8 shows a somewhat exaggerated-scale view of exemplary valve stem 114 of the type described hereinabove, attached to the rim 108 of the wheel. The valve stem can be constructed from a combination of rigid and flexible materials including rubber, synthetic fibers and metals (such as brass).

Commercially available valve stems, of the type generally depicted in FIG. 8, typically include a small-diameter ³⁄₁₆ to ¼-inch brass inner tube, surrounded by a thick ¼ to ½-inch rubberized outer covering for reinforcement and protection. The valve stem is seated within a hole 230 in the rim 108 so that a rubberized bottom flange 232 forms an airtight seal with respect to the rim. The upper portion of the stem includes a plastic or metallic threaded end 234, within which is mounted a moving press valve member 236. The moving valve member is typically threaded into a wall 240 within the valve stem. The wall 240 provides a bearing surface for a valve seal 242. The valve 236 is generally spring-loaded by a spring unit (not shown) to bias it upwardly into sealing contact with the bearing surface 240. When the valve is moved downwardly (arrow 244), the valve seal 242 is moved away from the wall 240 allowing air to pass therethrough. Conversely, the seal 242 is normally held tightly against the wall 242, thus preventing air from passing there through. The valve shown and described is somewhat simplified, as most commercially available valves include internal springs and stops that force the valve seal 242 upwardly against the wall 240. The internal pressure of the tire serves to maintain the valve seal 242 against the wall 240. By applying pressure of sufficient magnitude and/or physically pressing down the tip of the valve 236, air can be forced into the valve stem to further fill the tire.

The saddle valve 130 includes a body 250 having internal threads 252 adapted to mate with external threads 254 on the threaded end 234. A threaded secondary fill inlet 260 is located at the upper end of the body 250. A second press valve 262 is located with respect to the secondary fill inlet 260. The valve 262 can be constructed similarly to the conventional valve 236. The length of the body 250 can be adapted to accommodate such a valve. A sealing member 264 on the end of the valve 262 prevents passage of air through the secondary fill inlet 260 until the valve 262 is moved downwardly (arrow 270). Beneath the valve is an open chamber 272 that communicates with the internal threaded area 274 of the body 250. A projection or nub 276 is constructed within the chamber 274 so as to bear upon the original press valve 236. Accordingly, when the saddle valve body 250 is threadingly applied to the valve stem, the nub 276 presses down the valve 236, allowing air to pass from the valve stem 114 into the saddle valve chamber 272. The air can not normally pass through the secondary fill inlet 260, due to the sealing action of its valve 262. However, air is able to pass through the side tap 280 on the body 250, and whence to the gauge through the attached feed tube.

According to an alternate embodiment, the secondary fill inlet 260 and valve 262 can be omitted, allowing the body to act as a sealed cap. Note that a sealing ring 282 is provided on the top portion of the space 274 to bear upon the upper surface 286 of the threaded end 234. This prevents leakage when the nub 276 depresses the valve 236.

In this embodiment, it is contemplated that the gauge is sealed against leakage so that an airtight circuit is maintained between the valve stem and the gauge. According to an alternate embodiment, the nub can be omitted and the original press valve 236 is simply removed from the valve stem 114, completing the circuit. The sealing ring 282 would be maintained along with the secondary inlet 260 and valve 262.

Figure 9:
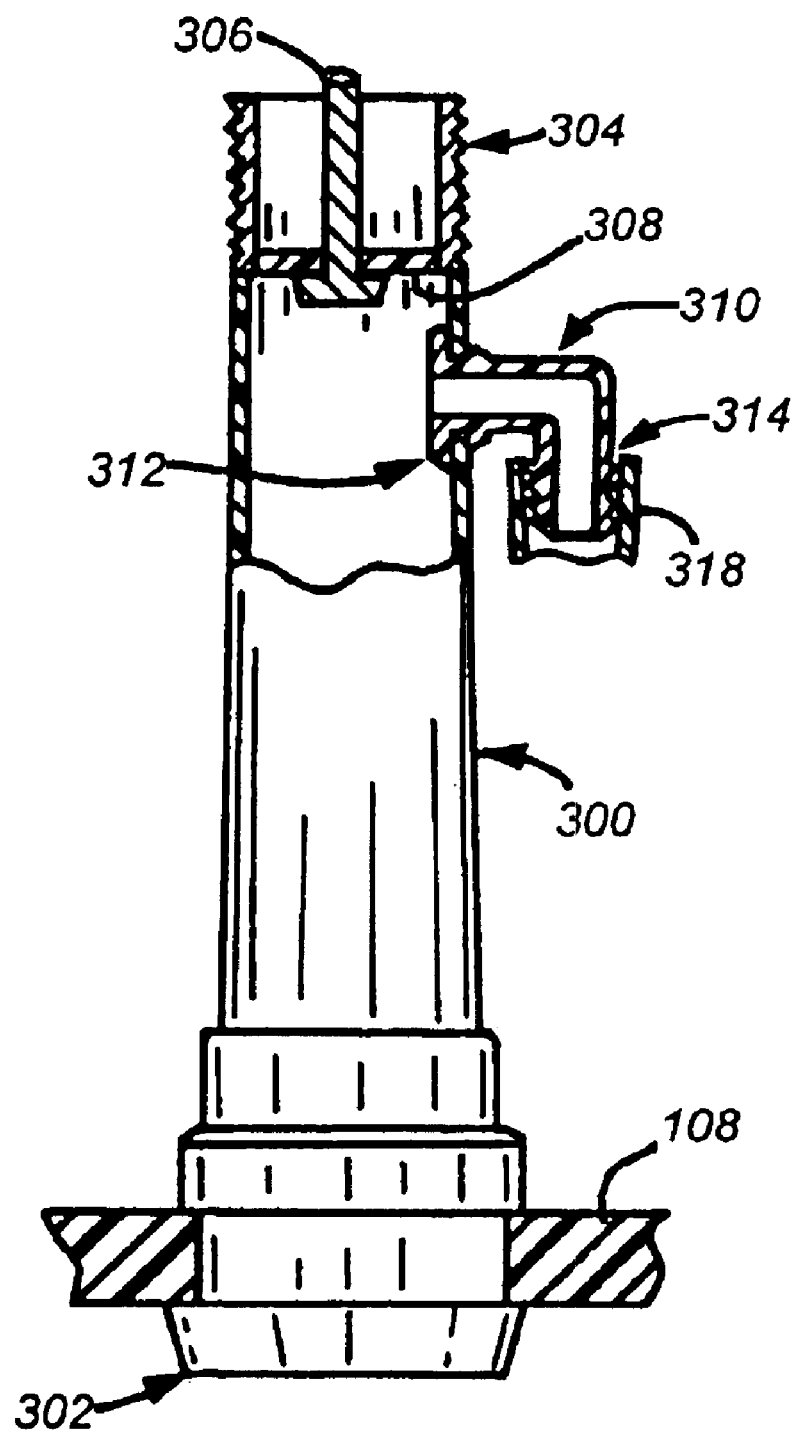
FIG. 9 is a modified valve stem including a pressure gauge interconnection according to an alternate embodiment.

FIG. 9 details an alternate embodiment in which a modified valve stem 300 is provided. The valve stem 300 includes a conventional lower portion 302 that is sealingly secured to the rim 108. A conventional threaded end 304 is provided with a moving valve 306, also of conventional design. Along a sidewall of the stem 300, between the valve wall 308 and the rim 108 is provided a tap 310. The tap is secured to the inner metallic wall of the valve stem by appropriate flanges 312, solders welds or other securing techniques so as to form an airtight seal. The tap can be part of a unitary tube for feeding the gauge or, it can include a serrated end 314 over which is mounted a high-pressure flexible tube end 318. In this embodiment, again, an airtight circuit must be maintained between the gauge and the tap 310 to prevent leakage for the wheel.

Figure 10:
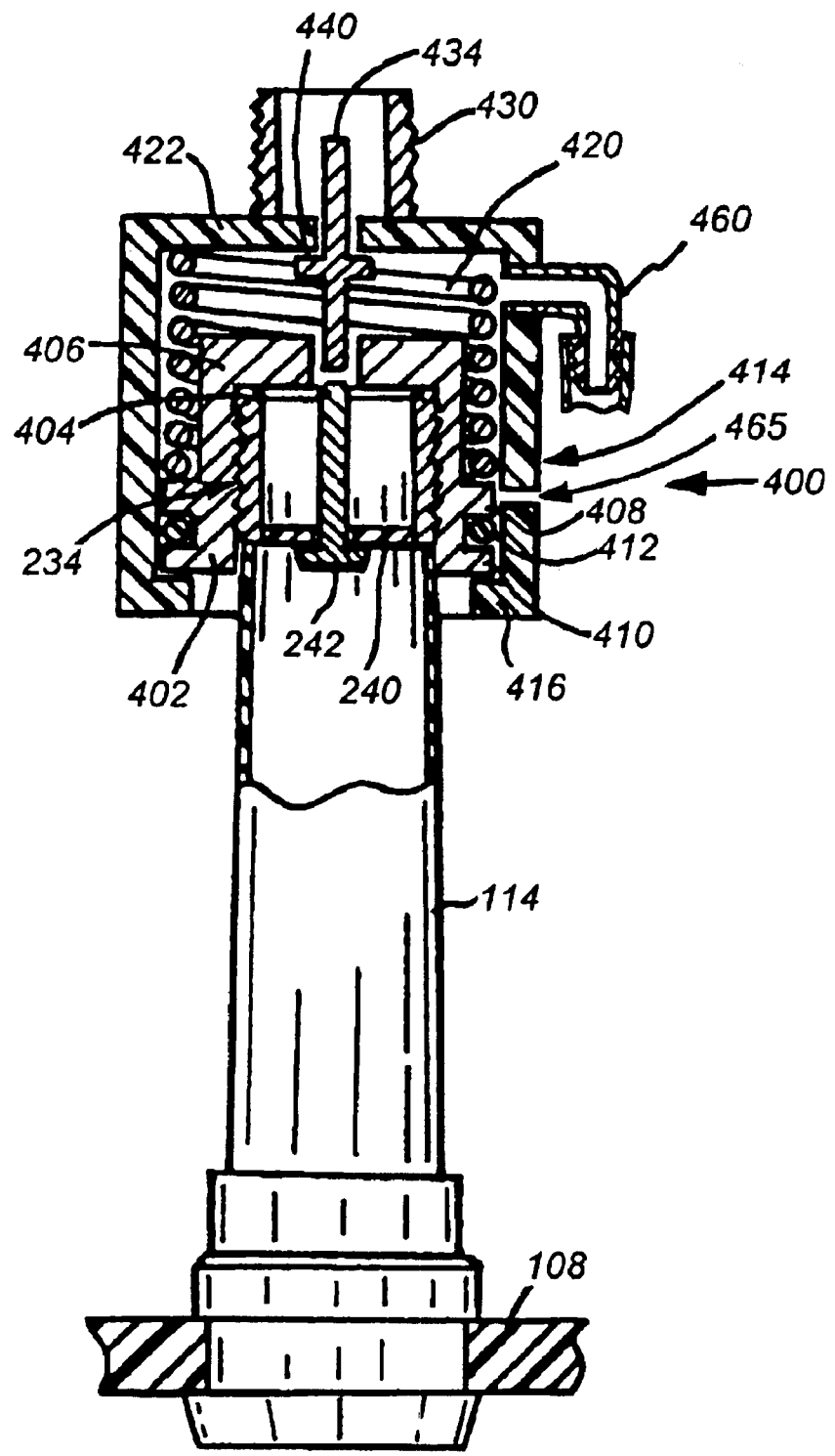
FIGS. 10–12 are side cross sections of a valve stem and saddle valve pressure gauge interconnection with built-in gauge actuator mechanism according to an alternate embodiment of the invention, shown in closed, actuated and air-fill modes, respectively.
Figure 11:
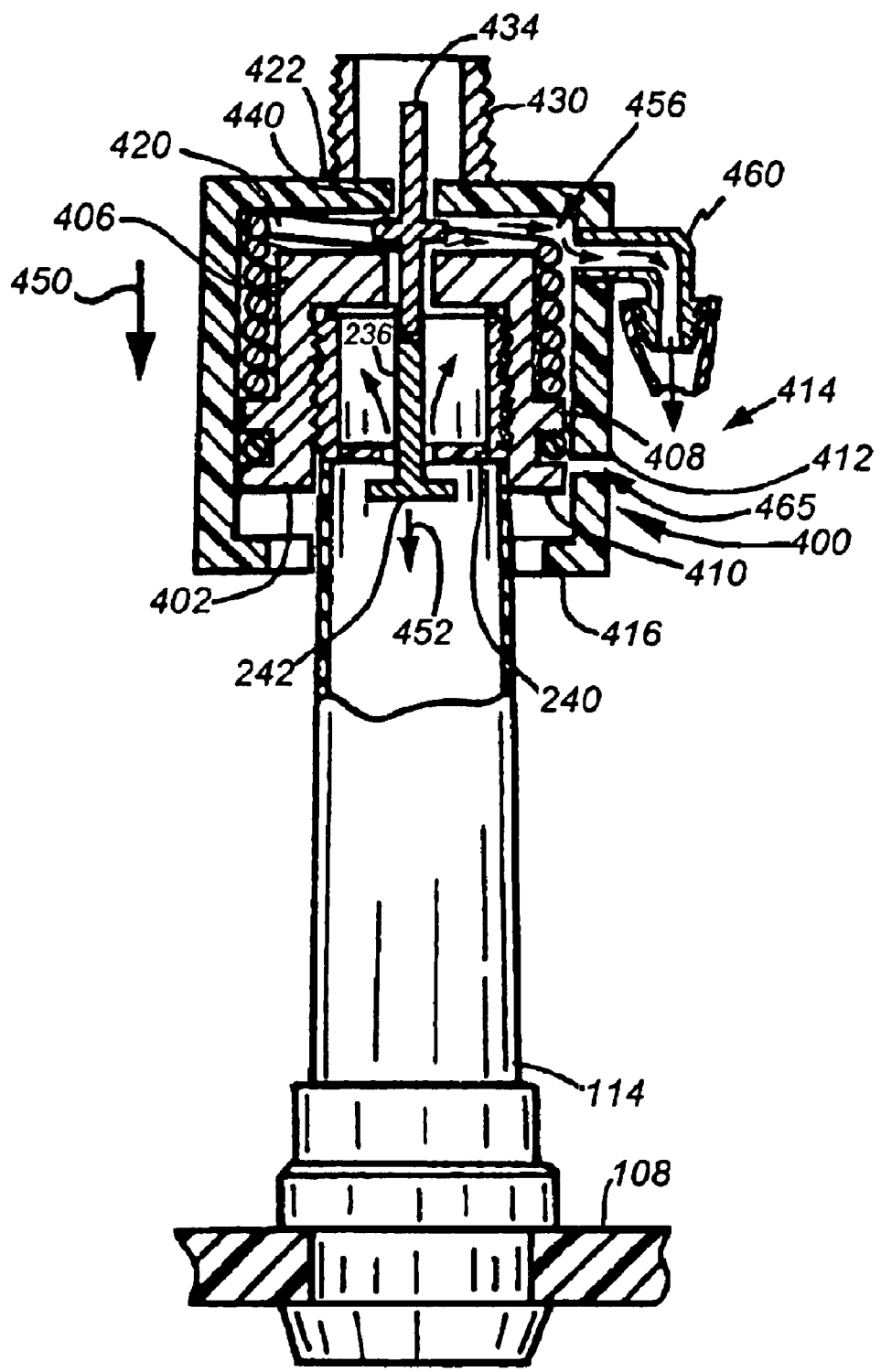
Figure 12:
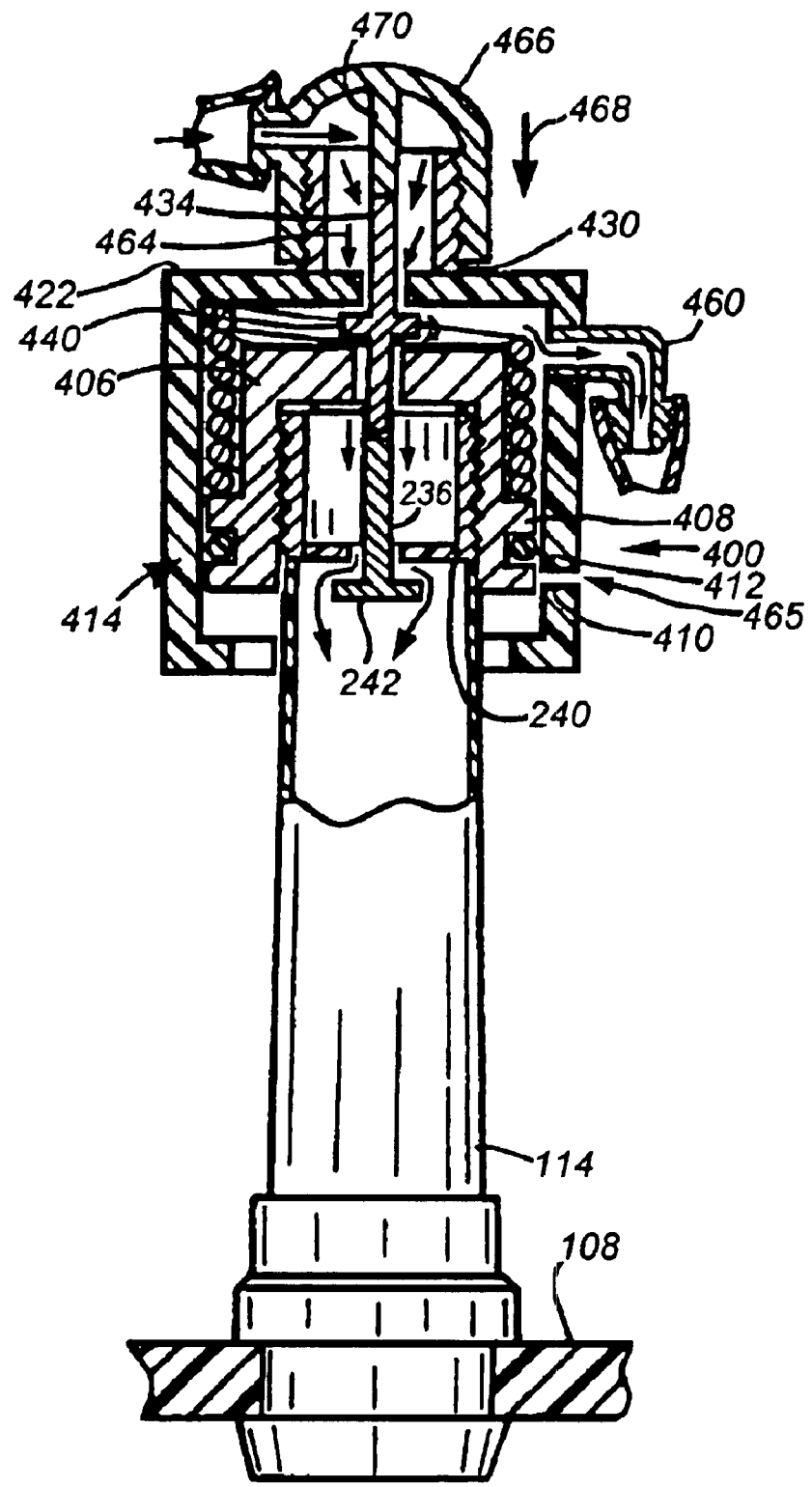

FIGS. 10–12 detail yet another embodiment of an interconnection for use with a conventional/original valve stem. The foregoing interconnections (e.g., the saddle valve of FIG. 8 and modified valve stem of FIG. 9) provide a constant real-time pressure supply to the gauge. These designs enable continuous monitoring of tire pressure without any operator intervention. However, for added security, it may be desirable to provide a simplified, actuatable gauge construction that minimizes the possibility of leakage from the valve stem between tire inspections.

With reference to FIG. 10, a two-part saddle valve 400 is shown in engagement with a conventional valve stem 114 having a threaded end 234. The saddle valve 400 includes a base portion 402 that is threaded to engage the threaded end 234. A sealing ring 404 is provided to seal the upper end 406 of the base 402 to the threaded end 234. The base includes an upper shoulder 408 and a lower shoulder 410. Between the shoulders is located an O-ring 412. The O-ring provides a seal against the inner surface of an outer member 414. The outer member 414 includes a lower shoulder 416 that interferes with the base shoulder 412. In this manner, upward movement of the outer member 414 beyond the predetermined limit is prevented. The upper shoulder of the base member provides a support for a spring 420. The spring bears against the upper end 422 of the outer member 414. At the top of the upper member is located a threaded secondary fill inlet 430. The threaded secondary fill inlet 430 includes a press valve 434. The valve 434 can include springs and other mechanisms for biasing the sealing member 440 of the valve 434 against the upper end 422 of the outer member 414.

As shown in FIG. 10, the outer member 414 is at a fully upward position, with the shoulder 416 bearing against the base shoulder 410. In this position, the valve 434 is remote from the stem valve 236. Accordingly, the stem valve 236 effectively seals the valve stem 114.

Referring to FIG. 11, applying a downward pressure (arrow 450) to a portion of the outer member 414 causes the outer member to bear against the spring 420 thereby moving it downwardly so that the shoulder 416 moves away from the base shoulder 410. The stem 434, in this position, contacts the stem 236, causing it to move, in turn, downwardly (arrow 452). Accordingly, air is allowed to flow from the valve stem into the threaded section and whence into the upper chamber 456 formed between the top and 406 of the base member 402 and the top end 422 of the outer member 414. This air is passed as shown by the arrows into a tap 460 formed in the side of the outer member. The O-ring seal 412 prevents excessive pressure loss between the base member and the outer member. Accordingly, the prevailing pressure in the tire, via the valve stem passes into the remote gauge 460. The valve 434 is still sealed against the exterior member, so all pressure passes to the gauge. The prevailing pressure within the gauge becomes balanced with respect to the prevailing pressure in the tire. In other words, if the gauge maintains a pressure higher than the prevailing pressure, these amounts will equalize so that the accurate, prevailing pressure is revealed at the gauge. A bleed valve or hole 465 can be provided within the saddle valve 400 (just above the O-ring in this embodiment) so that pressure within the gauge is relieved after the downward pressure on the outer member is released. This prevents an older, possibly inaccurate pressure reading from being stored in the gauge after inspection.

Finally, as shown in FIG. 12, the upper valve stem 434 has been moved downwardly (arrow 464). This results when a conventional compressor-driven air-fill nozzle 466 is applied (arrow 468) over the secondary fill inlet 430. The air-fill nozzle 466 typically includes a stem 470 for depressing a valve. The position of the top of the press valve 434 is placed so that it is depressed normally in the process of applying an air-fill nozzle thereover. The downward movement of the press valve 434 places the sealing member 440 out of contact with the top end 422 of the outer member 414.

The size and movement range of the stem 434 is chosen, in combination with the movement range of the outer member 414, so that the valve 236 is able to move further downwardly under action of the valve 434. In other words, downward movement of the outer member 414 to a maximum limit does not fully depress the valve 236. Accordingly, application of the fill cap enables further additional movement of the valve 236 to occur without resistance. The valves and their guide ways through various walls within the structure can include appropriate ports and passages to facilitate air to move from one section to another without resistance when valves are depressed appropriately. Note that in FIG. 12 air is enabled to pass through the tap 460 during filling (as well as into the tire). Accordingly, the user can monitor the valve as a tire is filled.

The saddle valve of this and other embodiments can be constructed from a variety of materials including metals, plastics, and a combination thereof. Any of the valves herein can be combined with any of the gauge arrangements herein to define a desired gauge and interconnection assembly.

Figure 13:
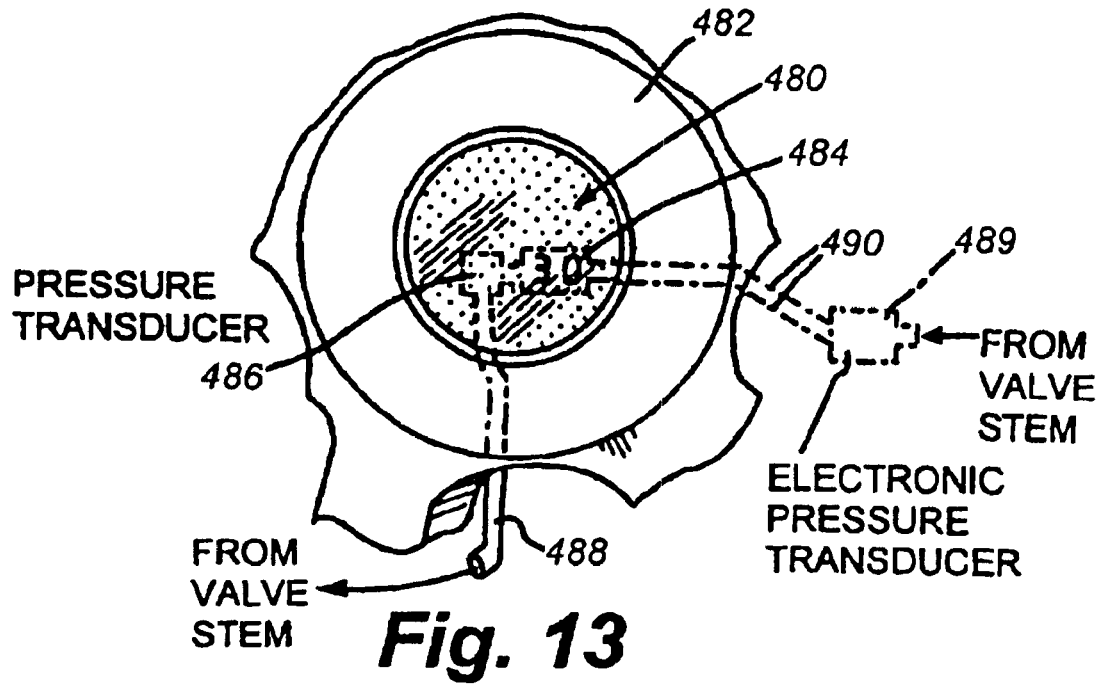
FIG. 13 is a partial fragmentary perspective view of an electronic hub display for tire pressure according to an alternate embodiment of this invention.
Figure 14:
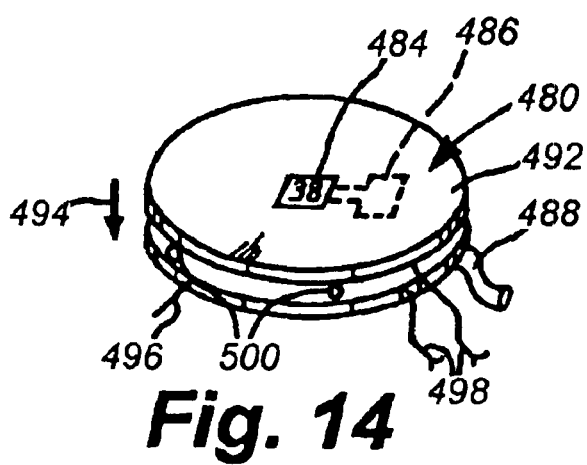
FIG. 14 is a somewhat schematic plan view of an electronic display for a tire pressure gauge according to an alternate embodiment.

FIG. 13 shows an alternate embodiment of this invention in which an electronic gauge 480 is provided within the center hub 482 of a wheel. The electronic gauge can appear as a black or otherwise dark reflective surface. At a predetermined time (such as when a pressure change is sensed) or when a switch is depressed, a display 484 can light revealing the prevailing pressure within the wheel. A bright light omitting diode (LED) can be used for the display. This structure has the advantage of being invisible until activated. The display unit 484 can include circuitry necessary to drive the display function and to interpret data received from a pressure transducer 486. This transducer is interconnected via an appropriate tube 488 to a valve or other interconnect. Alternatively, an electronic pressure transducer 489 can be provided adjacent to or in line with the stem. This transducer includes two or more electronic leads 490 that are fed directly to the circuitry within the display assembly 484. FIG. 14 shows an embodiment of the display hub 480 in more detail. The transducer 486 and display assembly 484 can be activated when an outer plate 492 of the hub is moved (arrow 494) into contact with an inner plate of the hub 496. Interconnecting wires 498 can energize each plate 492, 496. Springs 500 are used to separate the plates until they are brought together. A variety of interconnections, and other circuit configurations can be used to bring about the display of pressure on the hub.

The hub can be formed in a package that allows it to be easily inserted within the central receptacle of many conventional alloy rims. Most alloy rims include a small, snap-fit central cap having appropriate indents and tabs for mounting the cap within a presized hole. This hub can be adapted specifically to fit within the hole formed in any number of a variety of alloy rims. Additional adapters can be used to facilitate mounting in a large number of commercially available rims.

Figure 15:
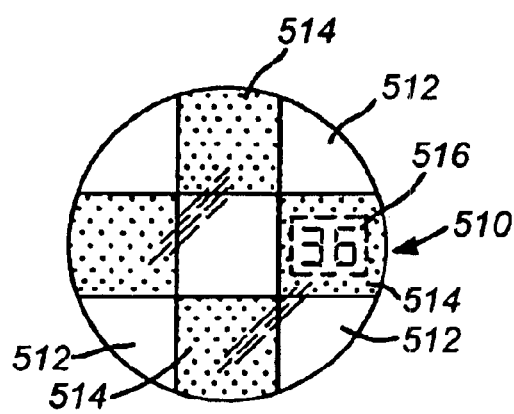
FIG. 15 is a somewhat schematic plan view of a decorative hub with incorporated tire pressure electronic display according to an alternate embodiment.

FIG. 15 shows a modified hub 510 having functions similar to those described to those described in connection with those described in connection with FIGS. 13 and 14. The hub 510 includes a decorative pattern of light and dark squares (512, 514 respectively). Within one of the dark squares is located the display 516. As described above, the display becomes illuminated when a pressure check is performed, causing the dark area to display a number representative of the pressure.

Figure 16:
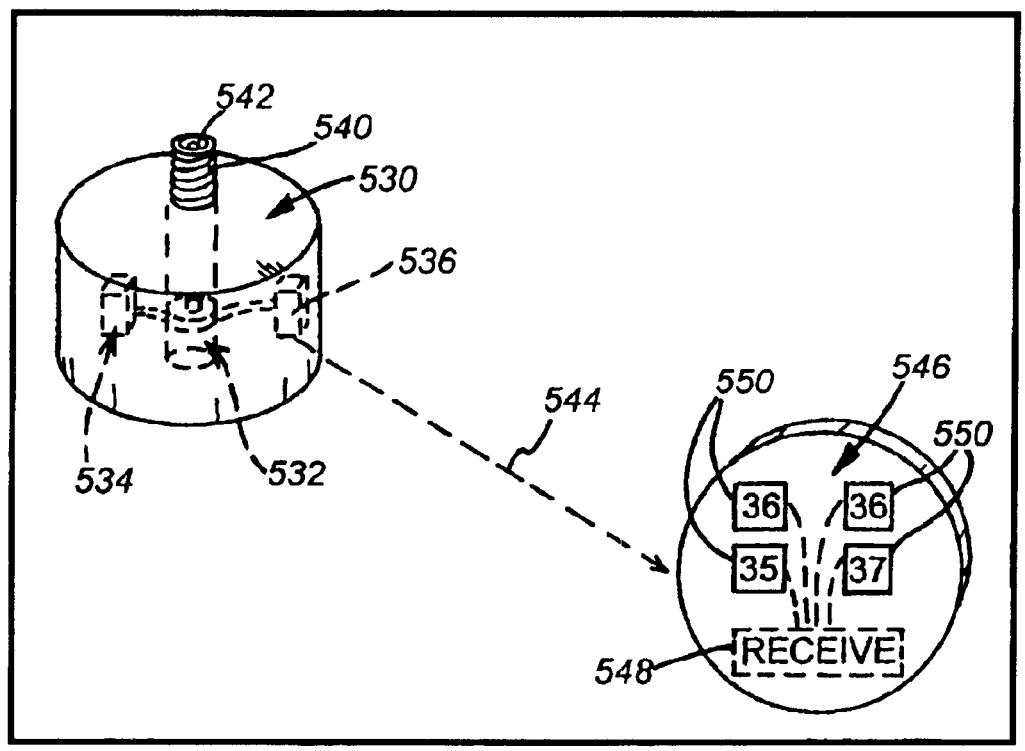
FIG. 16 is a schematic perspective view of a saddle valve with an on-board pressure transducer/radio transmitter and remote receiver/pressure display according to an alternate embodiment of this invention.

FIG. 16 shows a system in which a saddle valve 530 is adapted to be applied to the top of the valve stem (not shown). So as to create a seal and direct the prevailing pressure into the saddle valve 530 through a projection or nub within the base 532 of the saddle valve 530. A battery 534 and transmitter circuitry 536, with appropriate pressure transducer, is provided within the enlarged saddle valve 530. In addition, a secondary fill inlet 540 with a corresponding valve 542 is provided to enable the tire to be filled. The transmitter 536 can be configured using a number of recently developed commercially available and inexpensive radio frequency technologies. One such technology is the newly developed Bluetooth standard. A signal is transmitted (phantom arrow 544) to a receiver and display unit 546. A radio frequency receiver element 548 is provided to the unit 546. This transmits data to four separate display windows 550 that report the pressure of each individual wheel. The layout and mounting of the display elements 550 can be widely varied. Any of the electronic devices described herein can include on board batteries of a variety of sizes. Appropriate battery compartments that facilitate ready replacement of batteries can be provided. Use of battery power can be minimized by operating circuits intermittently. For example, transmission (arrow 544) of pressure data can be performed at a relatively intermittent interval (once per hour or less) unless a significant and sudden change in pressure is detected.

Figure 17:
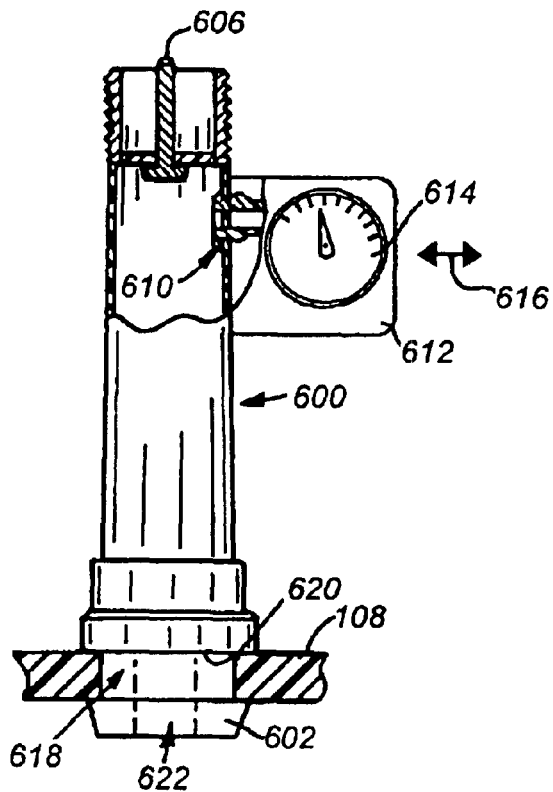
FIG. 17 is a partially exposed side view of a valve stem and gauge assembly according to an embodiment of this invention.

It is expressly contemplated that the gauge according to this invention can be part of the valve-stem construction, itself FIG. 17 shows an exemplary valve stem assembly 600 mounted into a rim 108 using a sealing flange 602. A conventional fill end 604 and press valve 606 are provided at the remote end. In addition, a tap 610 is provided in the sidewall of the stem below the valve 606 so as to remain in communication with tire pressure. The tap extends from the side as shown and mates in fluid communication with a gauge housing 612. On the housing 612 is located a visible gauge—either a mechanical gauge 614, as shown, or an electronic transducer/gauge assembly (similar to FIG. 7). The gauge 614 and tap 610 remain in constant fluid communication using appropriate connectors and seals. In order to facilitate repair and installation of the stem assembly 600 on the rim, the housing 614 can be removable (double arrow 616). This allows the stem to be freely passed upwardly through the hole 618. A threaded attachment between the housing and stem can be used to facilitate quick sealed attachment to and detachment of the housing from the stem. Alternatively an enlarged, specialized stem can be employed, providing that a removable flange assembly is provided at the bottom of the stem. In this instance, the flange is tightened onto the stem after the stem is passed into the hole 618 from above. The exemplary stem extension 620 (shown in phantom) can be used. It includes a threaded end 622 that engages threads on the flange 620 to alternatively allow mounting of an enlarged stem with a gauge housing thereon.

Figure 18:
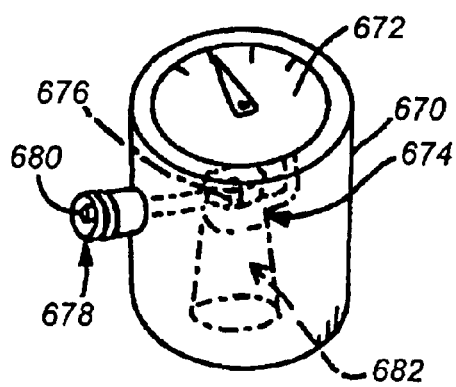
FIG. 18 is an exposed perspective view of a valve stem and top-mounted gauge assembly according to an alternate embodiment.

FIG. 18 shows a more symmetrical integral gauge stem design 650. The stem 650 includes an enlarged base 651 that is a cylinder in this example. Atop the base is a gauge 652. A side mounted fill inlet 654 is provided, including a press valve 656. This inlet is connected with the central stem chamber 658 (shown in phantom). The central chamber is also in communication with the gauge via an interconnection 660. The central chamber can be arranged to directly feed an inlet of the gauge at the top of the chamber according to an alternate embodiment. The central chamber can be permanently attached to the flange region 662 or can be threaded to the flange region by threads 664. This enables the base 651 to be screwed to and unscrewed from the flange region (curved double arrow 666) during mounting and service. Alternatively the flange 668 can be removable as described above referencing FIG. 17. This design has the advantage of enabling a more compact, sturdy package for the stem.

Figure 19:
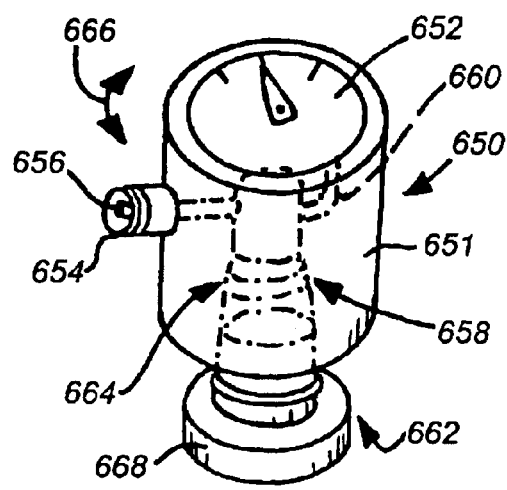
FIG. 19 is an exposed perspective view of a saddle valve with top-mounted gauge according to an embodiment of this invention.

Further, FIG. 19 details a saddle valve-type cylindrical gauge base 670 with gauge 672. The base includes a threaded end 674 (with appropriate sealing ring as detailed above but not shown) that engages a threaded end of a conventional stem (not shown). A nub 676 can be provided to depress the stem, placing the gauge and secondary fill inlet 678 (with valve 680) in communication with the tire pressure. Alternatively, the original stem press valve can be removed entirely. The base is elongated, and includes a central bore 682 for receiving a portion of the valve stem therein. This provides a lower profile to the unit, and greater sturdiness.

Figure 20:
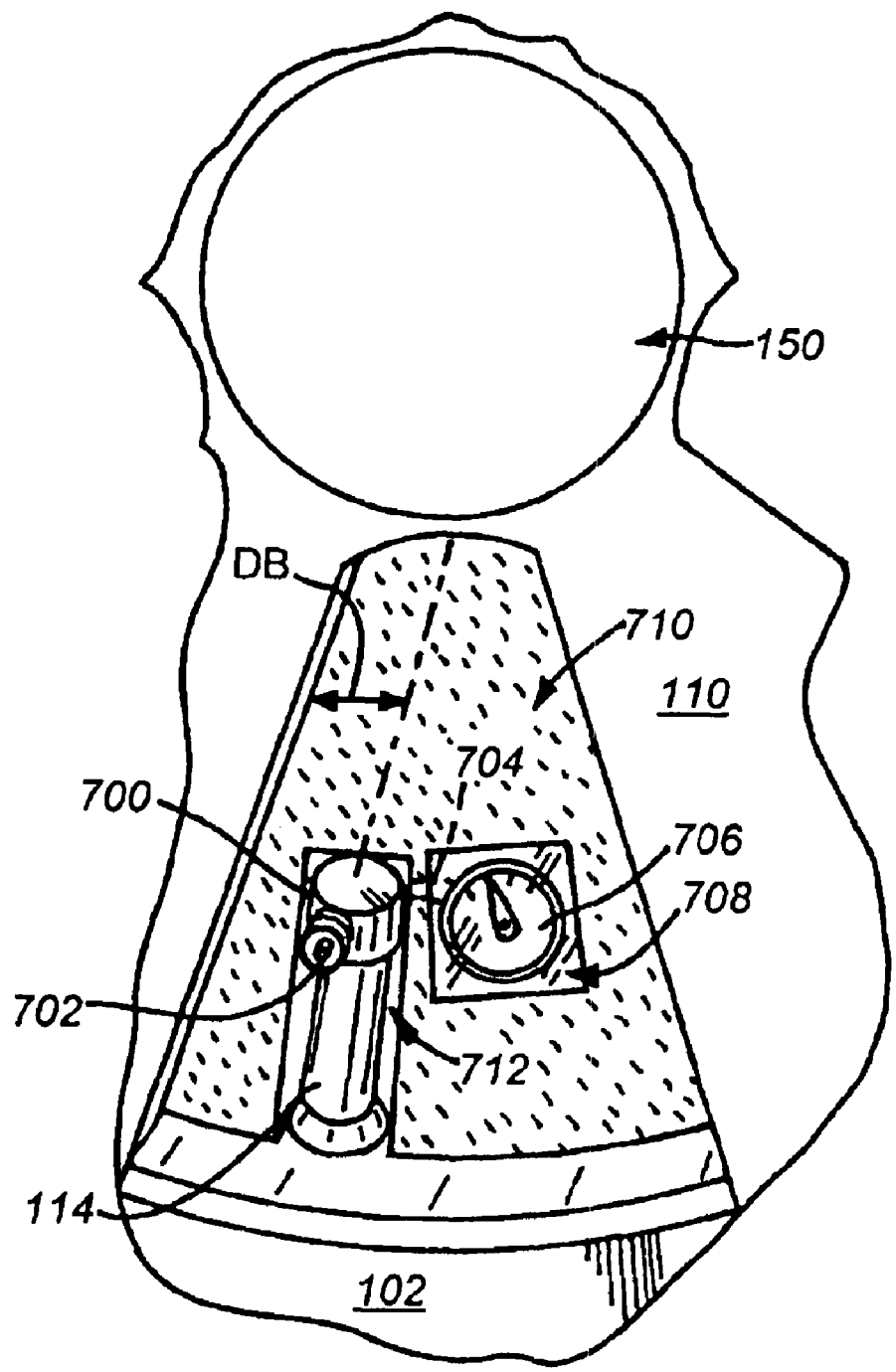
FIG. 20 is a fragmentary perspective view of a tire and rim containing a saddle valve and interconnected gauge mounting block according to an embodiment of this invention.

FIG. 20 shows another embodiment of this invention in which the valve stem 114 includes a saddle valve 700 having a front-projecting secondary inlet 702. The saddle valve is constructed and attached to the valve stem generally in accordance with one of the embodiments of this invention. The saddle valve 700 includes a pressure tap and line 704 (shown in phantom). According to an alternate embodiment, a modified stem with integral pressure tap can be employed.

The tap and line 704 interconnects with a pressure gauge 706 according to this embodiment. A mechanical gauge is shown but any type of electronic gauge or transducer/sending unit can be substituted according to an alternate embodiment. The gauge is mounted within a clear (optional) window 708 on a mounting base block according to this embodiment. The block 710 is a piece of relatively lightweight and durable material, typically a foam or cross-linked polymer that is sized to be press-fitted between the spokes 110. The block can include an internal guideway for the tap line so that it is largely concealed. It also includes a tunnel 712 that provides clearance for the stem 114 and saddle valve 700. This tunnel can include headroom, where applicable for a valve that is actuated by an operator, such as described with reference to FIG. 10. The block has a depth DB that is variable, but generally sized to the depth of the spokes 110 according to one embodiment. If a sufficiently pliable material is used, the block can include rear flanges or flares (not shown) that extend behind the spokes, to assist in locking the block in place. The block can be secured by friction, or with the assistance of an adhesive or tape. In one embodiment, the block can be provided as an oversized unit, in which the perimeter is cut by the installer to fit the particular wheel arrangement. In general, the block is considered "form-fitting" with respect to the sides of the spoke bay and typically with respect to the rim area and hub area as well. The color of the block can vary to accommodate the aesthetics of the wheel. In addition, the block can be mounted on a remote spoke bay from the stem-containing bay, requiring a longer pressure line and, typically, the omission of the tunnel 712.

Figure 21:
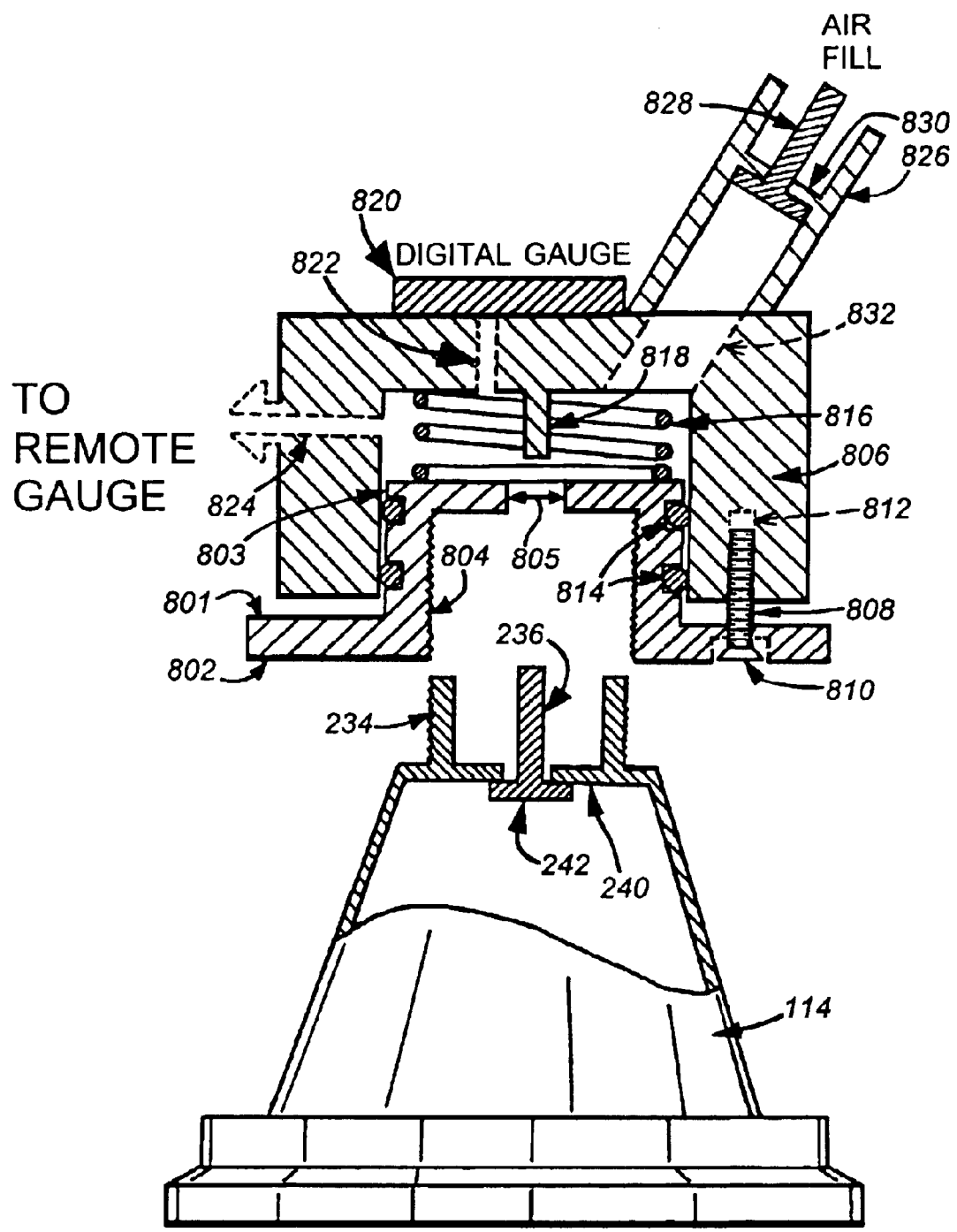
FIG. 21 is a cross section of a valve stem and saddle valve pressure gauge interconnection with built-in gauge actuator mechanism according to an exemplary embodiment of this invention.
Figure 22:
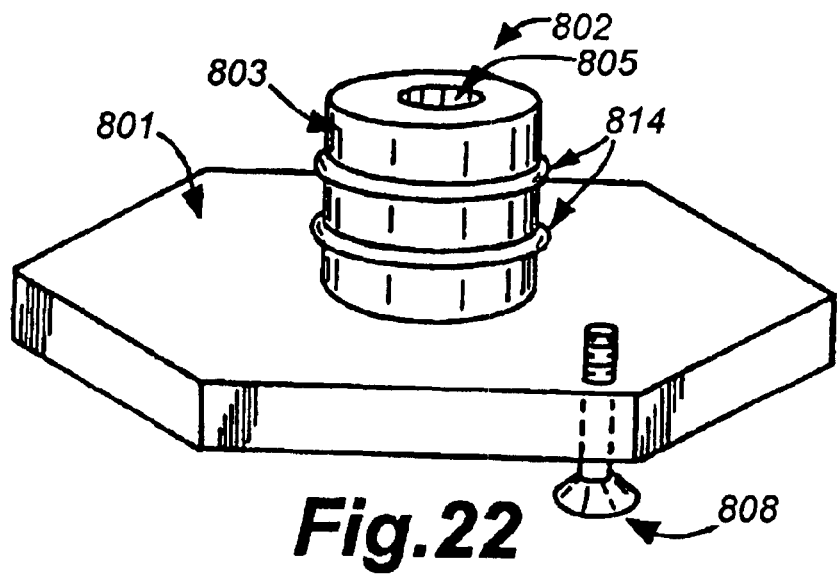
FIG. 22 is a partially exposed perspective view of a base member of a saddle valve assembly according to an embodiment of this invention.
Figure 23:
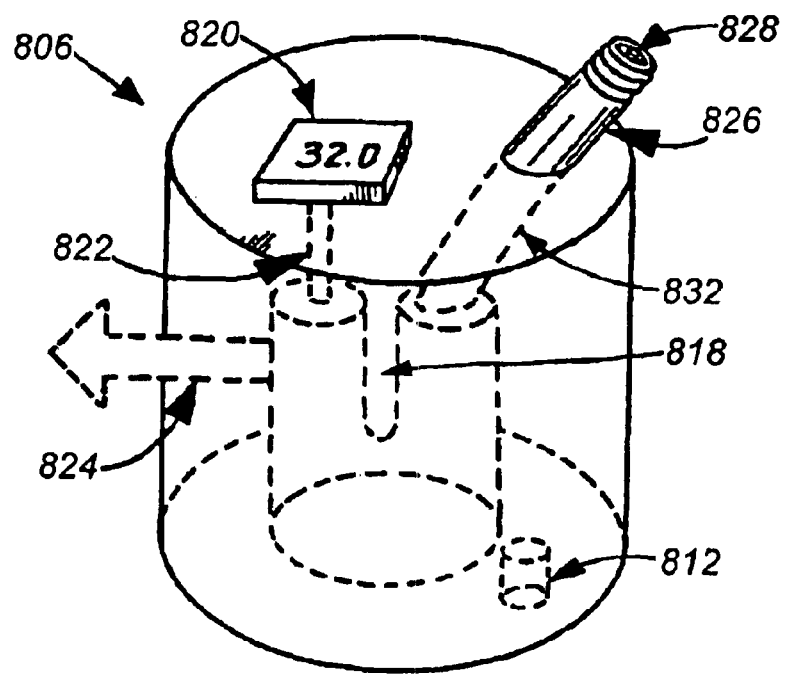
FIG. 23 is a partially exposed perspective view of an upper member of a saddle valve assembly according to an embodiment of this invention.

FIGS. 21–23 illustrate an actuatable saddle valve assembly, according to another embodiment of the invention, that attaches to a conventional tire stem 114. The saddle valve includes a base member 802, which comprises an outer section 801 and a cylindrical inner section 803. The base member is connected to an upper member 806 by a screw 808. The screw is fitted through a hole 810 in the outer section of the base member and fastened to a hole 812 that partially extends into the upper member. As shown, the hole 810 may be drilled so the head of the screw 808 is flush against or recessed into the base member. Additionally, the hole 812 may be pre-tapped, or, alternatively, the screw may be self-tapping (i.e., trilobular or roll-forming). Further, the screw may be a conventional locking screw, such as a Nylock screw. It is also expressly contemplated that the screw may be replaced with other fasteners known in the art, such as rivets, bolts, nails, etc., and, if necessary, a plurality of fasteners (and respective holes) may be used to connect the base member with the upper member.

The saddle valve assembly is attached to the tire stem 114 by engaging the threaded end 234 of the tire stem to a threaded surface 804 inside the cylindrical inner section 803. The outer section 801 of the base member may be hexagonal, or another suitable geometry that facilitates its interconnection with the tire stem. Once the saddle valve is screwed onto the tire stem, the press valve 236 in the tire stem remains closed. That is, the valve seal 242 remains in contact with wall 240 of the tire stem. A spring 816 is headed at the top of the cylindrical section 803, around a center hole 805; the spring applies an upward pressure on the upper member relative to the base member. In this manner, the spring ensures a center nub 818 attached to the upper member does not contact (and therefore depress) the press valve 236 when no external downward pressure is applied to the saddle valve. Adjustment of the screw 808 controls the spacing between the center nub and the tire's press valve and also ensures the spring force does not detach the upper member from the base member.

Figure 24:
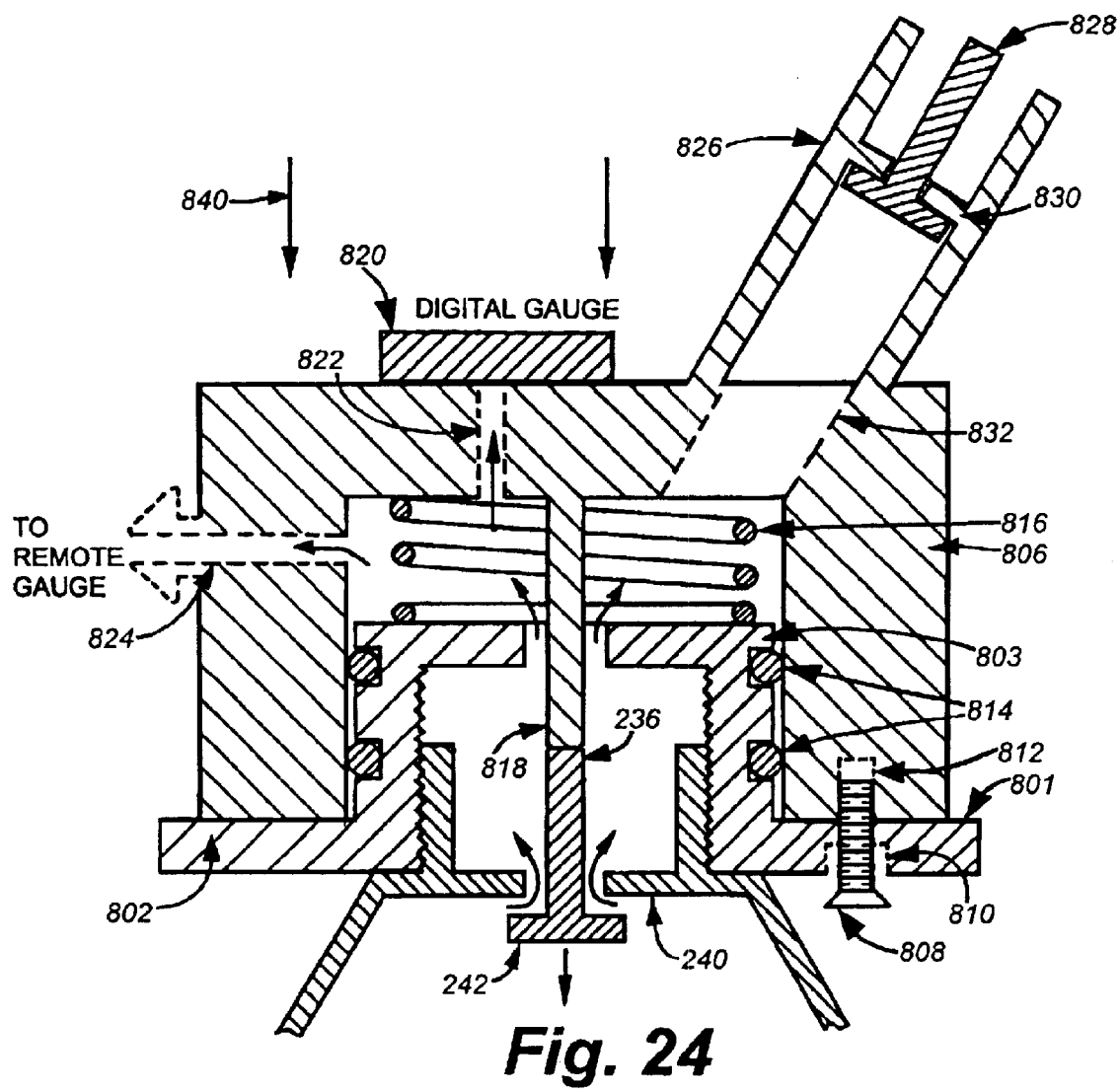
FIGS. 24–25 are cross sections of a valve stem and saddle valve pressure gauge interconnection with built-in gauge actuator mechanism, according to an exemplary embodiment of this invention, shown in closed, actuated pressure reading and air-filling modes, respectively.

As shown in FIG. 24, when a pressure reading is desired, an external downward pressure 840 is applied to a portion of the upper member of the saddle valve. The applied pressure compresses the spring 816 and drives the center nub 818 through the center hole 805 and onto the press valve 236, thereby allowing air to flow from the tire into the saddle valve (as shown by the arrows). One or more O-rings 814, seated in concentric channels on the inner section 803, prevent excessive air leakage from inside the saddle valve by providing a pressure seal between the outer surface of the base member and the inner surface of the upper member. Therefore, air pressure from the tire reaches an equilibrium in the saddle valve, and the pressure may be directed, e.g., through a channel or tap 822 in the upper member to a top-mounted pressure gauge 820. In an alternate embodiment, air flow from the tire may be directed through a channel or tap 824 to a pressure gauge feed tube (not shown) coupled to a remote pressure gauge. The remote gauge may be mounted in accordance with any of the gauge arrangements set forth herein. When the external pressure 840 is released, the restoring force of the compressed spring 816 lifts the center nub from the tire's press valve 236, and the internal pressure of the tire returns the valve seal 242 against the wall 240, thus shutting off air flow out of the tire. A bleed valve or hole (not shown) may additionally be implemented in the saddle valve so the pressure in the gauge is relieved after the downward pressure on the upper member is released.

Figure 25:
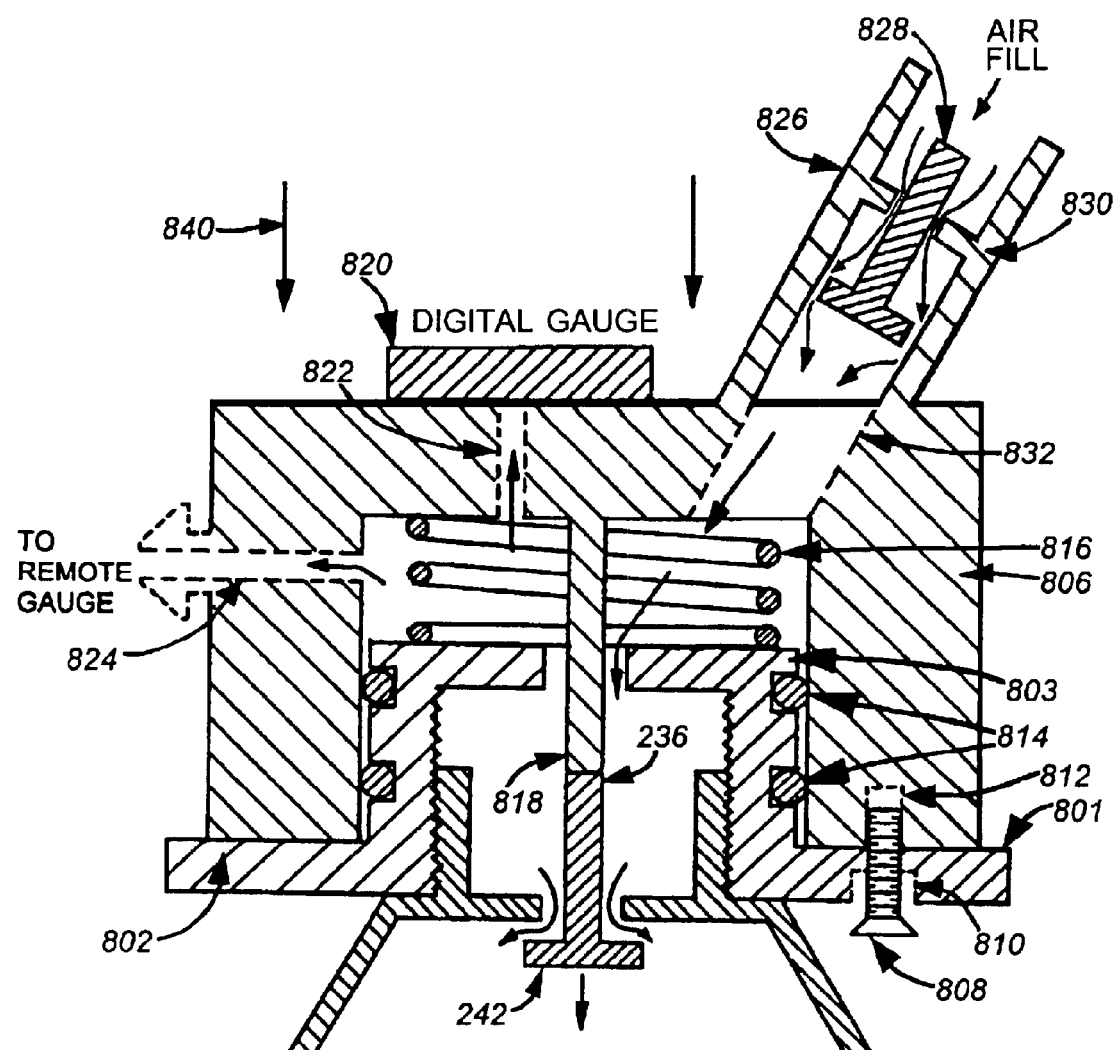

An air-fill tap 826 may be attached to the upper member 806. The tap allows the tire to be filled without having to remove the saddle valve assembly. For example, the air-fill tap may include a standard press valve 828 that maintains a pressure seal against a wall 830. The air-fill tap may also include springs and other mechanisms for biasing the pressure seal. As shown in FIG. 25, when the tire is filled with air, the saddle valve may be downwardly depressed to allow air communication between the saddle valve and tire (in a manner previously described in relation to FIG. 24). Application of an external hose coupled to a pressure source (not shown) may depress the valve 828 to allow air to flow from the hose into the saddle valve via channel 832, as indicated by the arrows. Advantageously, the air pressure may be monitored as the tire is filled by, e.g., a top-mounted pressure gauge 820 or a remote gauge coupled to the saddle valve. Because the saddle valve is downwardly depressed to allow air to flow from the hose to the tire, the tap 826 may be oriented substantially perpendicular to the top surface of the upper member 806.

Figure 26:
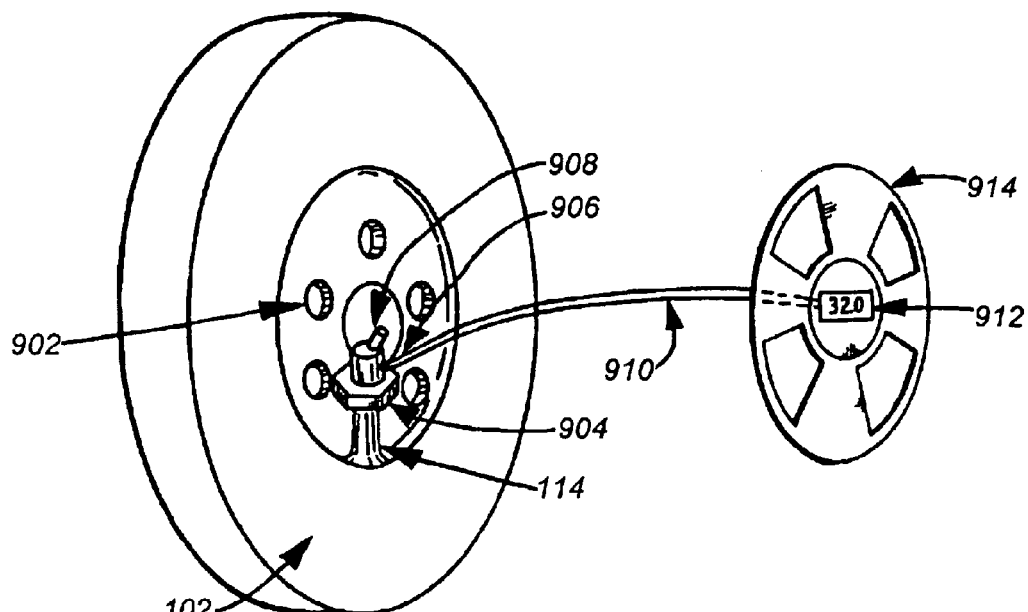
FIG. 26 is a perspective view of a saddle valve assembly, according to an embodiment of this invention, coupled to a pressure gauge mounted on a tire hub cap.

FIG. 26 illustrates a saddle valve 904 coupled to a remote pressure gauge 912 by a pressure feed tube 910. The remote pressure gauge may be, e.g., an electronic gauge mounted on a hub cap 914 that covers the lug nuts 902 of a tire 102. The saddle valve is attached to the tire stem 114, and the pressure feed tube is connected to a tap 906 on the saddle valve. The other end of the tube 910 is coupled to the remote gauge. According to an illustrative embodiment, the tire may be filled through a secondary outlet 908 on the saddle valve. Thus, the tire may be filled and/or its air pressure measured without removing the saddle valve.

Figure 27:
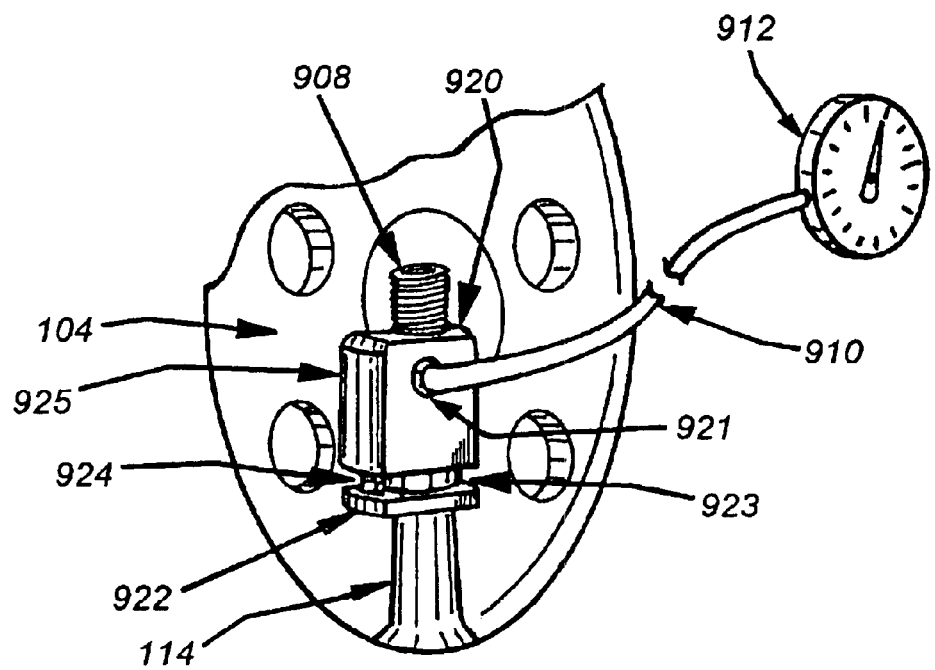
FIG. 27 is a fragmentary perspective view of a saddle valve assembly mounted on a tire stem and coupled to a remote pressure gauge, the saddle valve employing a locking mechanism in accordance with an exemplary embodiment of this invention.

FIG. 27 illustrates an exemplary saddle valve 920 according to another embodiment of this invention mounted on a tire valve stem 114 attached to an inner rim 104. The saddle valve includes a base member 922 that sealingly and threadingly attaches to the valve stem 114. A tap 921 on the saddle valve is connected to a pressure feed tube 910 which couples the saddle valve to a remote pressure gauge 912. The remote gauge may be mounted in various locations including, but not limited to, the rim 104, a spoke 110, the chassis or the saddle valve 920. Advantageously, the gauge is mounted in a manner that does not significantly affect the tire's balance and/or alignment. Further, the pressure gauge 912 may contain any combination of electronic and mechanical instrumentation, as known in the art. The saddle valve includes a secondary fill outlet 908 to which the end of a conventional filler hose (not shown) may be attached. The outlet 908 is oriented substantially perpendicular to the base member 922 to facilitate connection with the filler hose. However, the outlet can be located at a variety of orientations so long as it remains in communication with the airway of the valve. Accordingly, the tire may be filled without removing the saddle valve 920 from the valve stem 114.

In accordance with an illustrative embodiment, the pressure gauge 912 displays a pressure reading in response to a sufficiently large downward displacement of an upper member 925 relative to the base member 922. The upper member is attached to the base member by a screw 924 or other appropriate fastening means, such as a nail, bolt, rivet, etc. A spring (not shown) within the saddle valve applies a constant upward pressure on the upper member 925 relative to the base member 922. The spring force separates the upper member from the base member and forms an air gap 923 therebetween. The screw 924 spans the air gap 923 and prevents the upper member 925 from detaching from the base member 922.

When a sufficient downward pressure is applied to the saddle valve 920, the upper member 925 moves through the air gap 923 closer to the base member 922. As a result of this movement, air communication is established between the saddle valve 920 and the valve stem 114, and a tire pressure reading may be obtained from the gauge 912. This is, in essence, a momentary pressure reading. Significantly, the saddle valve only depresses a press valve in the tire valve stem when a pressure reading is taken. In this way, the normal operation of the valve stem's press valve to seal the tire is never compromised. When not depressed, the valve stem acts like an ordinary stem cap. While the saddle valve 920 is depressed in this manner, the upper member 925 may be rotated with respect to the base member 922 to engage a locking mechanism that essentially "locks" the saddle valve in its depressed position. While the saddle valve remains in this locked position, a pressure source may be coupled to the fill outlet 908 by a filler hose (not shown) and air may be transferred from the pressure source to the tire. In this way, the gauge 912 continuously displays a pressure reading during the tire-filling process.

Figure 28:
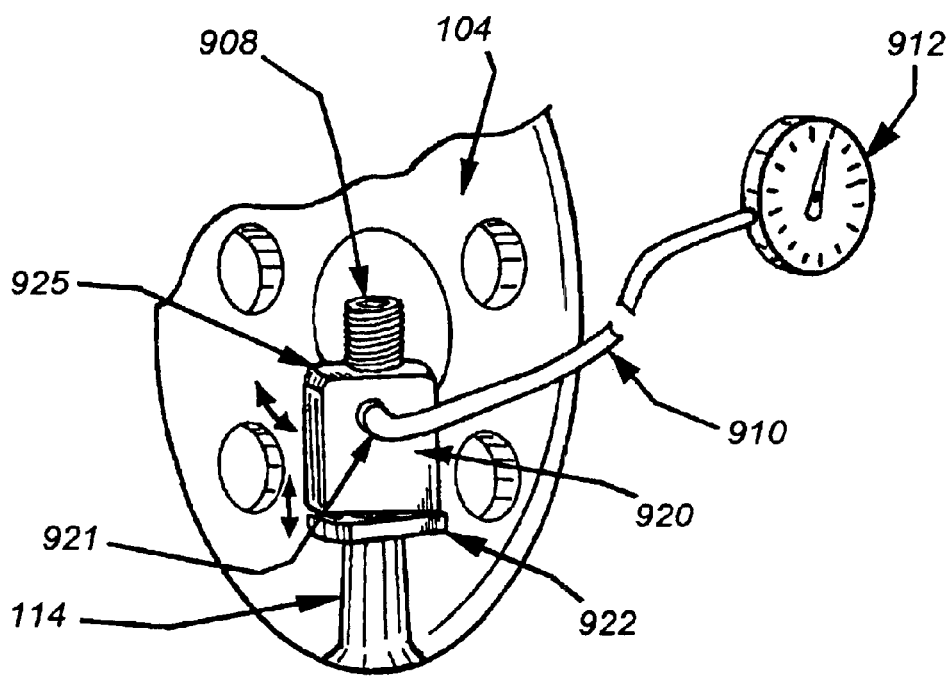
FIG. 28 is a fragmentary perspective view of the saddle valve of FIG. 28 with its locking mechanism engaged.

As shown in FIG. 28, the saddle valve 920 includes a locking mechanism that enables the saddle valve to maintain constant fluid communication with the valve stem 114. As noted, an initial downward pressure displaces the upper member 925 closer to the base member 922, and fluid communication is established between the tire and the saddle valve. At this point, the remote gauge 912 may display a tire pressure reading. Next, the upper member 925 is rotated with respect to the base member 922 to engage the locking mechanism on the saddle valve 920. In this "locked" state, the upper member remains in its depressed position relative to the base member, even after the downward pressure is removed. Continuous tire pressure readings may be obtained from the gauge 912 for as long as the saddle valve 920 remains in its locked position. The locking mechanism may be disengaged (and the air gap 923 reestablished) when the upper member 925 is rotated in an opposite direction with respect to the base member 922 than was used to engage the locking mechanism.

Figure 29:
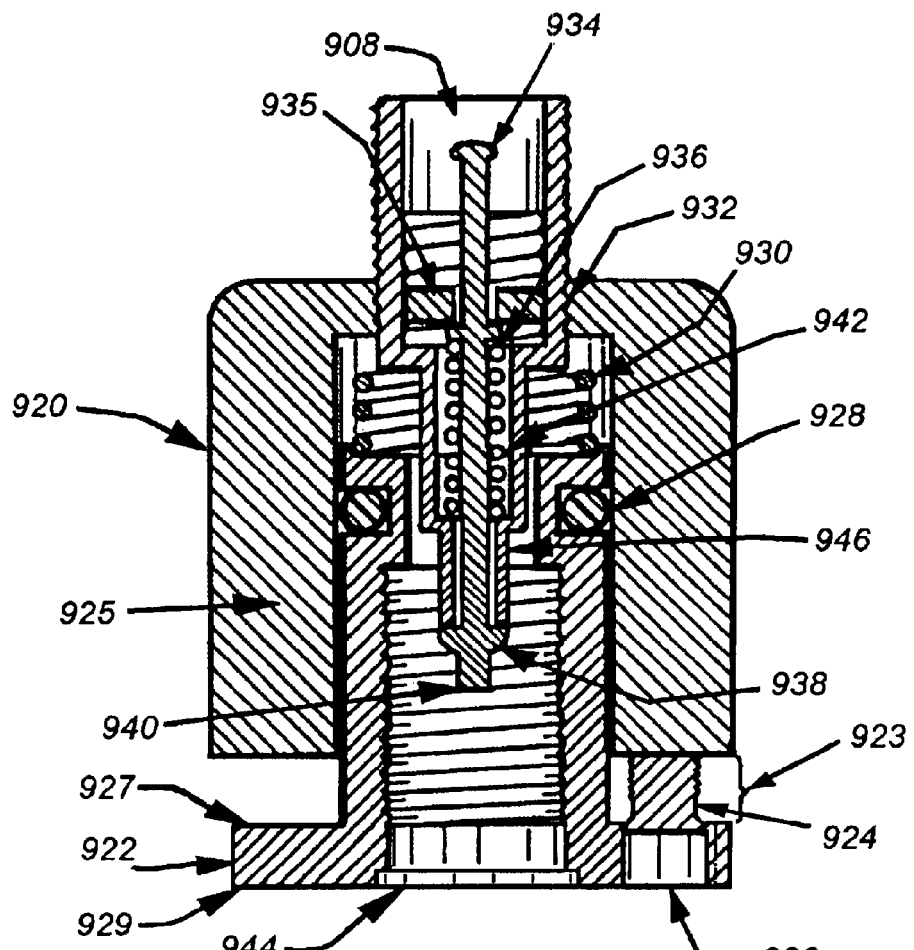
FIG. 29 is a cross section of a saddle valve assembly with built-in gauge actuator mechanism and locking mechanism, according to an exemplary embodiment of this invention.

FIG. 29 illustrates a cross sectional view of the saddle valve 920. Notably, the saddle valve's tap 921 is directed perpendicularly to this cross sectional view and is not depicted. The saddle valve includes a base member 922 that contains a threaded cylindrical hole 944 that sealingly and threadingly attaches to the tire valve stem 114. The base member 922 also includes a hole 926 through which the screw 924 connects the base member to the upper member 925. The screw is fitted through the hole 926 and threaded partially into the upper member. As shown, the screw 924 may be a conventional locking screw or other fastener known in the art, such as a nail, rivet, bolt, etc. The screw is removable in one embodiment to facilitate assembly of the upper member to the base member.

A spring 930 is headed at the top of the base member 922 so as to apply a constant upward force on the upper member 925 relative to the base member 922. In this manner, the spring 930 creates the air gap 923 between the base and upper members when no external downward pressure is applied to the saddle valve 920. One or more O-rings 928 are seated in concentric channels around the base member 922 to create a pressure seal between the outside surface of the base member 922 and the inside surface of the upper member 925. The O-ring(s) prevent excessive air leakage when air pressure is transferred into the saddle valve 920, e.g., from the valve stem 114 or secondary fill outlet 908.

A hole 932 in the upper member 925 may be sealingly and threadingly engaged to threads located on the outer surface of the secondary air-fill outlet 908. The secondary fill outlet contains a press valve 934 that extends the length of the outlet 908. A spring 942 in the secondary air-fill outlet exerts an constant upward pressure on a flange 936 connected to the valve 934, thereby creating a pressure seal between the flange 936 and a wall 935 within the outlet 908. In addition, the spring 942 also creates a pressure seal against the side-walls 946 of the secondary fill outlet 908 by exerting an upward pressure on a flange 938 connected to the "bottom" of the press valve 934. The pressure seals created by flanges 936 and 938 prevent air leakage through the secondary fill outlet when no external force is applied to the saddle valve 920.

In operation, a downward pressure is applied to the upper member 925 and/or the secondary outlet 908 to compress the spring 930 and thus move the upper member 925 across the air gap 923, closer to the base member 922. Consequently, the center nub 940 at the bottom of the press valve 934 descends in the hole 944 until it makes contact with a preexisting press valve (not shown) in a tire valve stem 114. The depressed nub 940 exerts a downward pressure on the preexisting valve and "opens" the preexisting tire valve, thereby enabling air to flow from the tire into the saddle valve 920. The initial spacing of the center nub 940 relative to the preexisting valve may be adjusted by raising or lowering the upper member 925 relative to the base member 922. To that end, the hole 932 in the upper member may be rotated along the threads on the secondary outlet 908's outer surface to effectively adjust the vertical position of the upper member relative to the base member.

Figure 30:
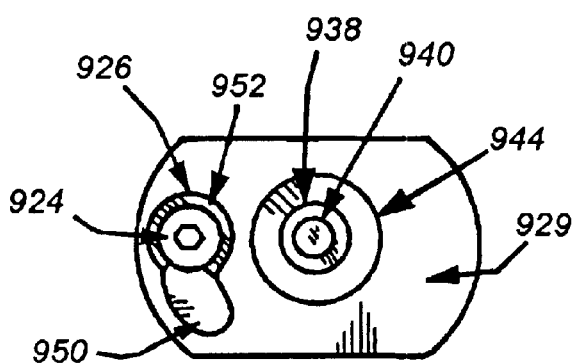
FIG. 30 is a perspective view of a bottom portion of a saddle valve assembly, according to an exemplary embodiment of this invention, illustrating a locking mechanism for maintaining constant fluid communication between the saddle valve and a tire valve stem.

FIG. 30 illustrates the bottom surface 929 of the base member 922 where a locking mechanism may be implemented for holding (i.e., "locking") the saddle valve 920 in a depressed position. A curvilinear channel 950 is cut through bottom surface 929. At one end of the channel 950 is the hole 926, which is connected to a circular rim 952. The rim is recessed in the channel 950, and illustratively is attached to the top surface 927 of the base member 922. When no external downward pressure is applied to saddle valve 920, the head of the screw 924 exerts an upward pressure against the rim 952, due to the spring force exerted by the spring 930. In this state, the head of the screw 924 is flush against the rim 952 and recessed in the hole 926.

When a sufficient downward pressure is applied, the head of the screw 924 is lifted off the rim 952. Then, when the upper member 925 is rotated relative to the base member 922 in the direction of the curvilinear channel 950, the head of the screw 924 may be positioned at the opposite end of the channel 950. If the downward pressure is removed, the restoring force of spring 930 causes the head of the screw 924 to again exert an upward pressure on the base member 922. However, rather than exert the upward pressure against the rim 952 connected to the top surface 927, in this "locked" position the screw instead exerts the upward pressure against the bottom surface 929 of the base member. In this way, the screw 924 is prevented from returning to its initially recessed position, e.g., on the rim 952, and the upper member 925 of the saddle valve 920 consequently can not return to its original separation 923 from the base member 922. The saddle valve is held in this locked position until the upper member 925 is rotated relative to the base member 922 so as to return the head of the screw 924 to realign with the hole 926.

The saddle valve of this and other embodiments can be constructed from a variety of materials including metals, plastics, and a combination thereof Any of the valves herein can be combined with any of the gauge arrangements herein to define a desired gauge and interconnection assembly. For example, the upper member 925 can be a hard plastic while other elements can be brass or another durable metal. Likewise, the remote gauge 912 can be substituted with an integrally mounted digital or mechanical gauge, a remote gauge coupled to an integral or remote pressure transducer or a radio transmitter, as described above.

The foregoing has be a detailed description of embodiments of the invention. Various modifications and additions can be made without departing from the spirit and scope of the invention. For example, the gauges used herein are exemplary only. Gauges that represent data regarding pressure in differing formats can be used. The gauges can be mounted at any number of a variety of clearly visible or somewhat hidden locations on the wheel. Where a radio is employed, the number of wheels on the vehicle being monitored can vary. For example the spare and all four running wheels (five total) can be monitored. In addition, those skilled in the art will understand that the springs disclosed herein may comprise various shapes (i.e., helical, conical, etc.) and materials, such as metals, rubbers, and synthetic polymers. It is also expressly contemplated that the secondary inlet, if any, can be located at any orientation (e.g. top-mounted, side-mounted) on the saddle valve or modified valve stem that enables convenient application of an air-fill nozzle. Finally, it is expressly contemplated that the concepts described herein can be applied to all types of vehicle wheels including cars, trucks, motor cycles, trailers, three and four-wheel cycles. Accordingly, this description is meant to be taken only by way of example, and not to otherwise limit the scope of the invention.

What is claimed is:

1. A tire pressure monitoring apparatus, comprising:
    a gauge that displays a pressure reading; and
    a saddle valve including:
        (i) a base member adapted to sealingly and threadingly connect to a tire valve stem,
        (ii) an upper member constructed and arranged to move relative to the base member at a predetermined time to provide fluid communication between a tire and the gauge, and
        (iii) a locking mechanism that, when engaged, secures the upper member in a position that maintains the fluid communication between the tire and the gauge until the locking mechanism is disengaged.

2. The tire pressure monitoring apparatus as set forth in claim 1, wherein the locking mechanism is engaged by rotating the upper member with respect to the base member.

3. The tire pressure monitoring apparatus as set forth in claim 2, further comprising:
    a fastening means that connects the upper member to the base member,
    wherein, in response to the upper member being rotated with respect to the base member, the fastening means is displaced along a curvilinear channel in the base member and acts to secure the upper member in the position providing constant fluid communication between the tire and the gauge.

4. The tire pressure monitoring apparatus as set forth in claim 1, further comprising a center nub that contacts and depresses a preexisting valve in the tire valve stem in response to the upper member being moved closer to the base member.

5. The tire pressure monitoring apparatus as set forth in claim 4, wherein the initial spacing of the center nub and the preexisting valve is adjusted by raising or lowering the upper member relative to the base member.

6. The tire pressure monitoring apparatus as set forth in claim 1, wherein the saddle valve further includes a tap in fluid communication with the gauge.

7. The tire pressure monitoring apparatus as set forth in claim 6, wherein the gauge is coupled to the tap by a feed line.

8. The tire pressure monitoring apparatus as set forth in claim 1, wherein the upper member includes a secondary fill inlet constructed and arranged to enable pressure to be transferred from a pressure source to the saddle valve.

9. The tire pressure monitoring apparatus as set forth in claim 8, wherein pressure is transferred from the pressure source to the saddle valve after the locking mechanism is engaged.

10. The tire pressure monitoring apparatus as set forth in claim 1, further comprising a housing for the gauge adapted to be mounted on and supported by the saddle valve.

11. The tire pressure monitoring apparatus as set forth in claim 1, wherein the gauge comprises a pressure transducer and an interconnected electronic display and wherein the electronic display is mounted on a hub cap.

12. The tire pressure monitoring apparatus as set forth in claim 1, wherein the gauge comprises a mechanical pressure gauge having graduations.

13. The tire pressure monitoring apparatus as set forth in claim 1, wherein the gauge comprises an electronic pressure gauge in communication with a pressure transducer that converts a pressure into an electronic signal.

14. The tire pressure monitoring apparatus as set forth in claim 13, further comprising:
    a radio transmitter, interconnected with the transducer, for converting the electric signal to a radio signal; and
    a receiver, interconnected to an electronic display, for converting the radio signal to a signal reported by the electronic display, the electronic display being located remote from the gauge.

15. The tire pressure monitoring apparatus as set forth in claim 1, further comprising a mounting bracket that supports the gauge, the mounting bracket comprising a pliable block that is form-fitting with respect to opposing spokes of the wheel.

16. The tire pressure monitoring apparatus as set forth in claim 15, wherein the block includes a tunnel for providing clearance for the valve stem and a tap on the saddle valve.

17. A tire pressure monitoring apparatus, comprising:
    a gauge that displays a pressure reading; and
    a saddle valve including:
        (i) a base member adapted to connect to a tire valve stem,
        (ii) an upper member constructed and arranged to move relative to the base member at a predetermined time to provide fluid communication between a tire and the gauge,
        (iii) means for securing the upper member in a position that maintains the fluid communication between the tire and the gauge after the upper member has been moved relative to the base member; and
        (iv) means for unsecuring the upper member from the position that maintains the fluid communication between the tire and the gauge.

* * * * *